(12) United States Patent
Usselman et al.

(10) Patent No.: US 9,698,621 B2
(45) Date of Patent: *Jul. 4, 2017

(54) PORTABLE POWER DRIVEN EQUIPMENT WITH INTERNAL COMBUSTION ENGINE COMBINED BATTERY CHARGING AND STARTING CIRCUIT WHERE THE BATTERY IS A REMOVABLE BATTERY PACK

(75) Inventors: Robert A. Usselman, Forest Hill, MD (US); Dalton E. McFarland, Medina, TN (US); Jeffrey P. Grant, Forest Hill, MD (US)

(73) Assignee: Black & Decker Inc., New Britain, CT (US)

( * ) Notice: Subject to any disclaimer, the term of this patent is extended or adjusted under 35 U.S.C. 154(b) by 1352 days.

This patent is subject to a terminal disclaimer.

(21) Appl. No.: 13/436,317

(22) Filed: Mar. 30, 2012

(65) Prior Publication Data
US 2012/0274077 A1 Nov. 1, 2012

Related U.S. Application Data

(62) Division of application No. 12/426,825, filed on Apr. 20, 2009, now Pat. No. 8,159,078.

(60) Provisional application No. 61/124,980, filed on Apr. 21, 2008.

(51) Int. Cl.
*H02K 13/04* (2006.01)
*H02K 7/18* (2006.01)
*F02N 11/04* (2006.01)
*H02J 7/14* (2006.01)
*F02D 29/06* (2006.01)
*F02N 11/14* (2006.01)
*F02N 11/08* (2006.01)

(52) U.S. Cl.
CPC ............ *H02J 7/1415* (2013.01); *F02D 29/06* (2013.01); *F02N 11/0862* (2013.01); *F02N 11/14* (2013.01)

(58) Field of Classification Search
CPC .................................... H02N 2/00; H02J 7/32
USPC ......... 310/12.12, 138, 339; 290/1 A, 30, 34, 290/36 R, 38 R; 320/112, 114, 137
See application file for complete search history.

(56) References Cited

U.S. PATENT DOCUMENTS

| | | | | |
|---|---|---|---|---|
| 4,517,507 A | * | 5/1985 | Nordbrock | H02J 7/1423 307/16 |
| 6,557,509 B1 | * | 5/2003 | Hall | F02B 61/045 123/179.16 |
| 8,159,078 B2 | * | 4/2012 | Usselman | F02D 29/06 290/1 A |
| 2007/0120366 A1 | * | 5/2007 | Grant | F02B 63/04 290/1 A |

FOREIGN PATENT DOCUMENTS

JP 07046713 A * 2/1995

* cited by examiner

*Primary Examiner* — Jose Gonzalez Quinones
(74) *Attorney, Agent, or Firm* — Michael Aronoff

(57) ABSTRACT

A portable generator system having an internal combustion engine, a starting device for starting the internal combustion engine and a power generating device for generating an AC signal for powering a charger assembly, the charger assembly adapted to receive the AC signal and to generate a DC charging signal. The charger assembly includes a first user controllable switch and a second user controllable switch.

14 Claims, 24 Drawing Sheets

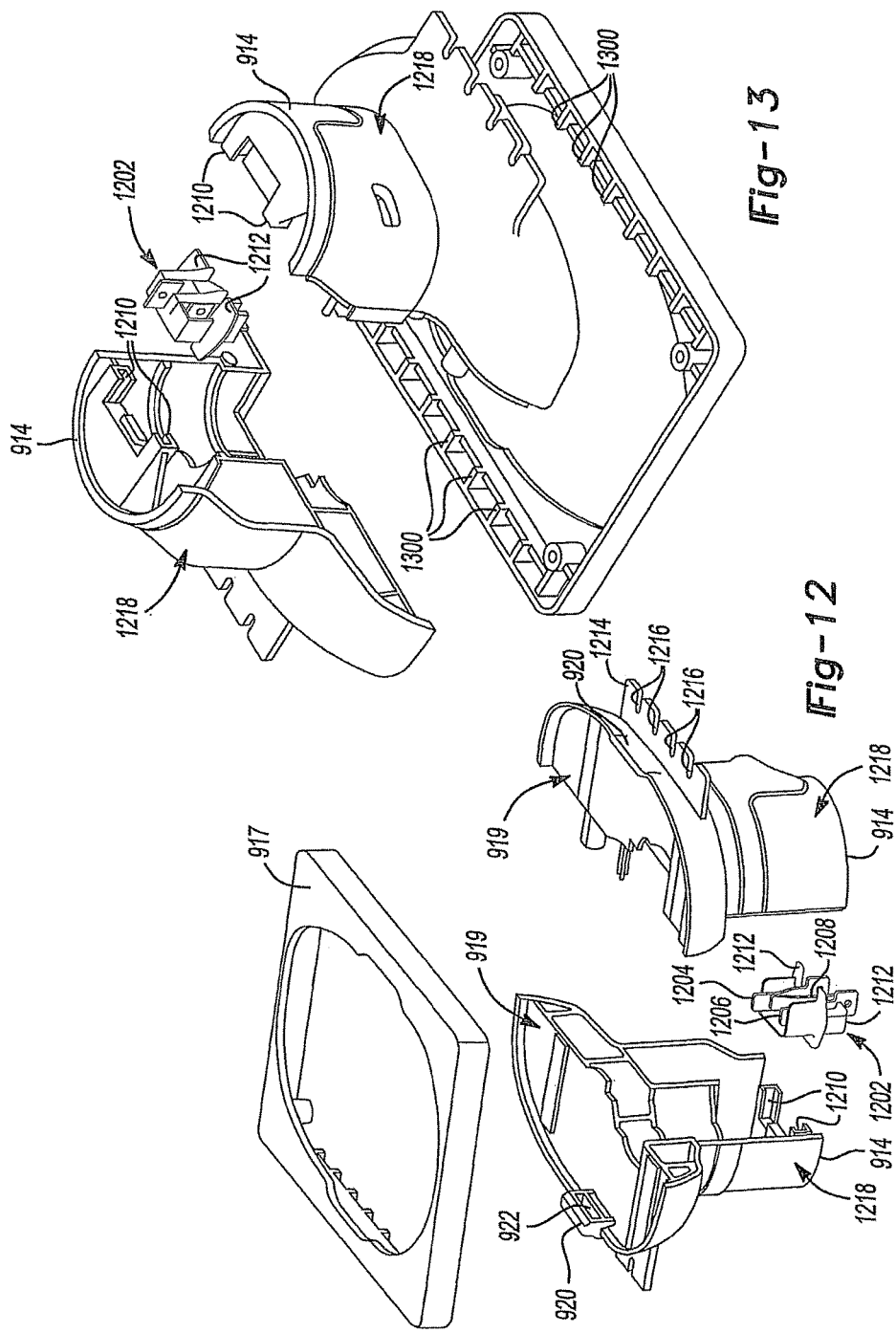

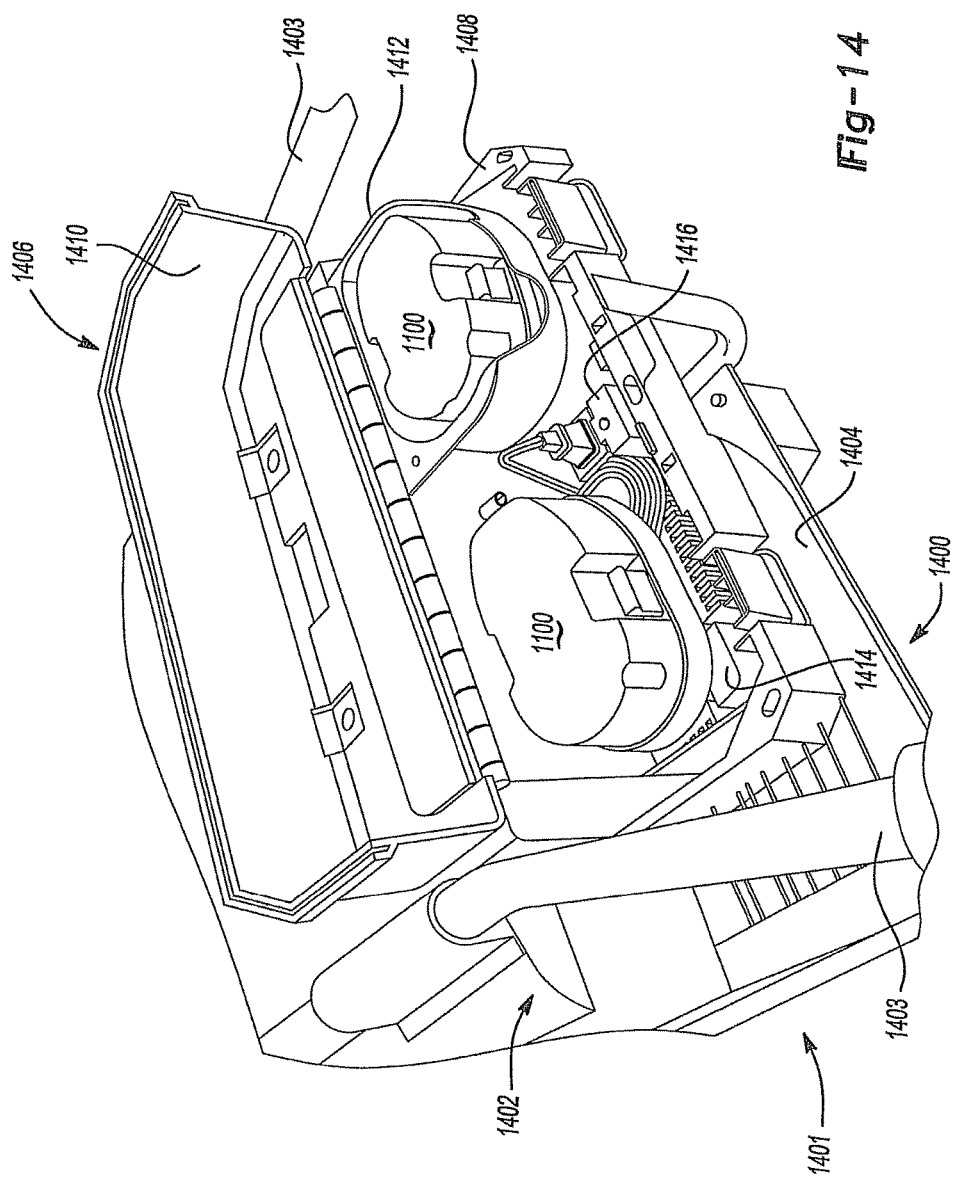

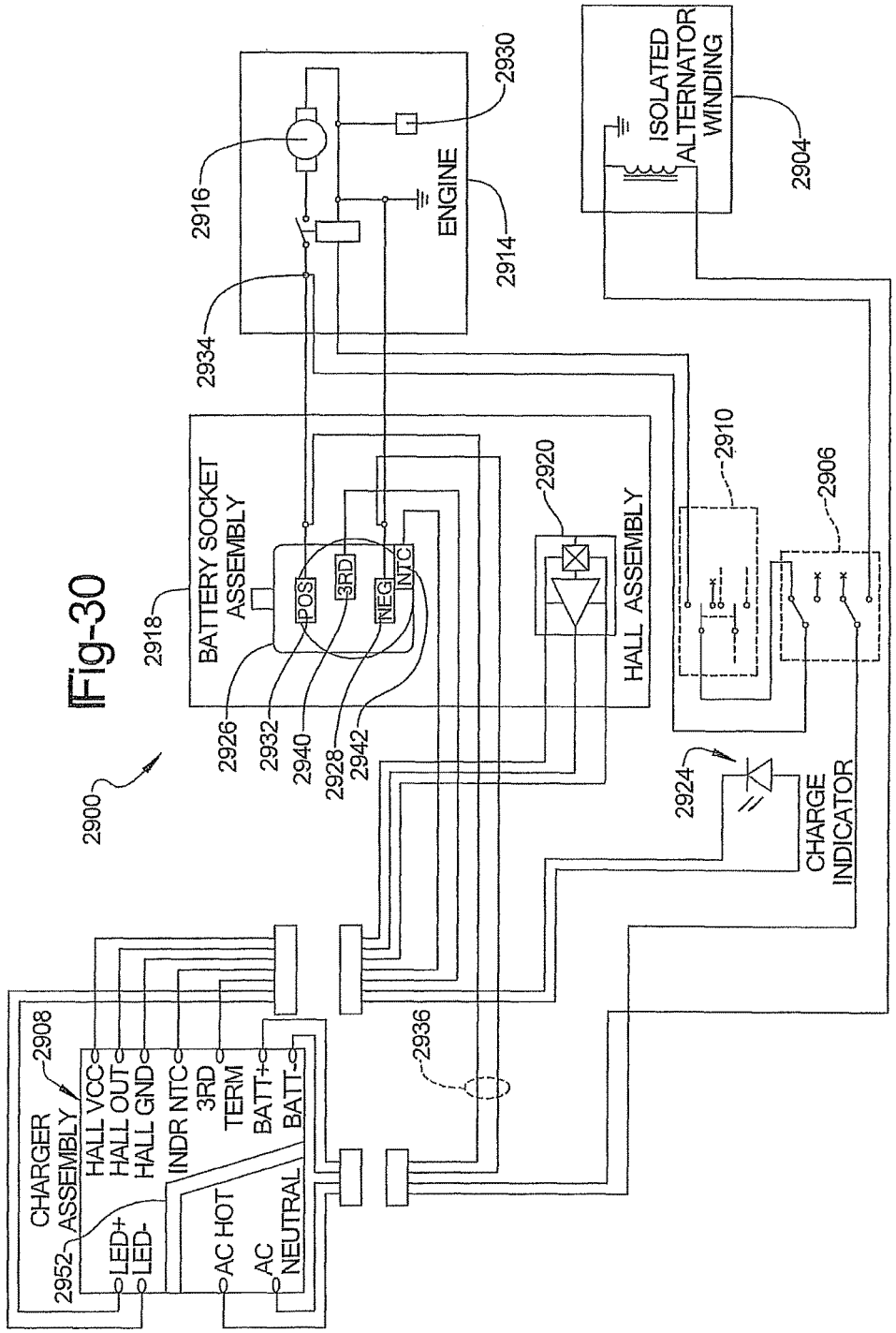

PORTABLE POWER DRIVEN EQUIPMENT WITH INTERNAL COMBUSTION ENGINE COMBINED BATTERY CHARGING AND STARTING CIRCUIT WHERE THE BATTERY IS A REMOVABLE BATTERY PACK

CROSS-REFERENCE TO RELATED APPLICATIONS

This application is a divisional of U.S. patent application, Ser. No. 12/426,825 filed Apr. 20, 2009, which claims the benefit of U.S. provisional application Ser. No. 61/124,980, filed Apr. 21, 2008. The disclosure of the above applications are incorporated herein by reference.

FIELD

This disclosure relates generally to portable power driven equipment having an internal combustion engine with electric start, and more particularly, to such equipment using a removable battery pack and having a combined battery charging and starting circuit.

BACKGROUND

Present day portable generators typically make use of a starter motor and a fixed lead acid battery to start an internal combustion (IC) engine that drives an alternator, thereby producing an electrical power output. The starter motor and fixed battery add size, bulk and weight to the portable generator. As can be appreciated, since the generator is intended to be transportable, keeping the generator as light and as small as possible is highly desirable.

In the latest portable generator technology, the alternator is replaced with a smaller and lighter permanent magnet generator (PMG) and an electronic power converter. In normal operation, the IC engine directly drives the PMG which then produces electrical power. This variable frequency (engine speed dependent), variable voltage power is then converted electronically to a constant voltage, constant frequency output, for example a 120 VAC, 60 Hz output. Typically, a PMG includes a single set of windings that are used to produce the electrical power output of the portable generator.

SUMMARY

The present disclosure relates to a portable generator system. The portable generator system may include a generator for generating an electrical output signal; an internal combustion engine for driving the generator; a starter for starting the internal combustion engine; an alternator for generating an AC signal for powering a charger assembly; a battery pack; and a charger system. The charger system may include a charger assembly adapted to receive the AC signal and to generate a DC charging signal for recharging the battery pack. The charger assembly may include a first user controllable switch and a second user controllable switch. The first user controllable switch may be used for applying an output of the battery to energize the starter. The second user controllable switch, when placed in a Start position, enables current from the battery pack to be used to energize the starter while inhibiting the application of the DC charging signal to the battery pack. When the second switch is moved into a Charge position, the second switch inhibits the battery pack output from being used to energize the starter while enabling the DC charging signal to be applied to the battery pack.

In another aspect the present disclosure relates to a portable generator that includes: an internal combustion engine, a generator adapted to be driven by the internal combustion engine for generating AC power, and a starter for starting the internal combustion engine. A battery socket assembly is configured to supply an electrical signal to the starter to drive the starter during a Start mode of operation of the generator. A DC battery back, adapted to be coupled to the battery socket assembly, may be used to provide DC power to the battery socket assembly, with the DC power forming the electrical signal for powering the starter. A first user engageable switch may be used for controlling the application of DC power to the starter. An alternator is driven by the internal combustion engine and has an alternator winding for generating an AC signal. A charger assembly responsive to the AC signal from the alternator winding is used to generate a DC charging current to recharge the battery pack when the battery pack is placed in the battery socket assembly. A second user engageable switch in communication with the battery socket assembly has a Charge position and a Start position. In the Charge position the second switch enables the DC charging current from the charger assembly to be applied to the battery socket assembly while the application of the DC power from the battery pack to the starter is inhibited, to thus enable a charging operation to be performed on the battery pack while disabling energization of the starter. When in the Start position the second switch inhibits the application of the DC charging current to the battery socket assembly while the application of the DC power from the battery pack to the starter is enabled, to thus inhibit a charging operation from being performed on the battery pack while enabling the DC power from the battery pack to be applied to the starter.

In still another aspect the present disclosure relates to a portable electrical generator system. The system may include a wheeled frame supporting an internal combustion engine that drives a generator device supported on the frame. The generator device generates AC power, and the internal combustion engine is coupled to the generator device. A starter device may be coupled to the internal combustion engine. A control panel may be coupled to the frame and may have at least one AC outlet coupled to the generator device. A charger assembly may be included with a charging control switch that is in communication with the charger assembly. The charging control switch may be moveable by a user between a Charge position and a Start position. The frame may be used for supporting a battery receptacle electrically coupled to the starter, the battery receptacle configured to receive a cordless power tool battery pack. The generator device may have a winding coupled to the charger assembly through the charging control switch, and the charger assembly may be electrically coupled to the battery receptacle. The charging control switch, when in the Charge position and when the engine is running, couples AC power provided by the winding to the charger assembly to energize the charger assembly. The charging control switch, when in the Start position, decouples the AC power provided by the winding from the charger assembly to deenergize the charger assembly while enabling current from the battery pack to be applied to the starter.

In another aspect the present disclosure may comprise a method for controlling charging of a battery pack used to start a portable generator. The method may comprise using an alternator winding of an alternator driven by an engine of the generator to produce an AC signal. The AC signal may be used to drive a charger assembly, the charger assembly operating to generate a DC charging signal for charging the battery pack. A switch having a Start position and a Charge position may be used and configured relative to the battery pack and the charger assembly such that, when in the Start position, the switch inhibits the DC charging signal from being applied to the battery pack, while enabling DC power from the battery pack to be used to energize a starter for starting the engine. And when the switch is moved into the Charge position, the switch enables the DC charging signal to be applied to the battery pack while inhibiting the battery pack from being used to apply DC power to energize the starter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 12 is an exploded perspective view of a battery receptacle of the control panel of FIG. 9;

FIG. 13 is an exploded perspective view of the battery receptacle of the control panel of FIG. 9;

FIG. 14 is a side perspective view of a portable generator;

FIG. 30 is a schematic diagram of another embodiment of the integral charging system of FIG. 25.

DETAILED DESCRIPTION

The following description of various embodiments is merely exemplary in nature and is in no way intended to limit the present disclosure, its application or uses.

Figure 1:
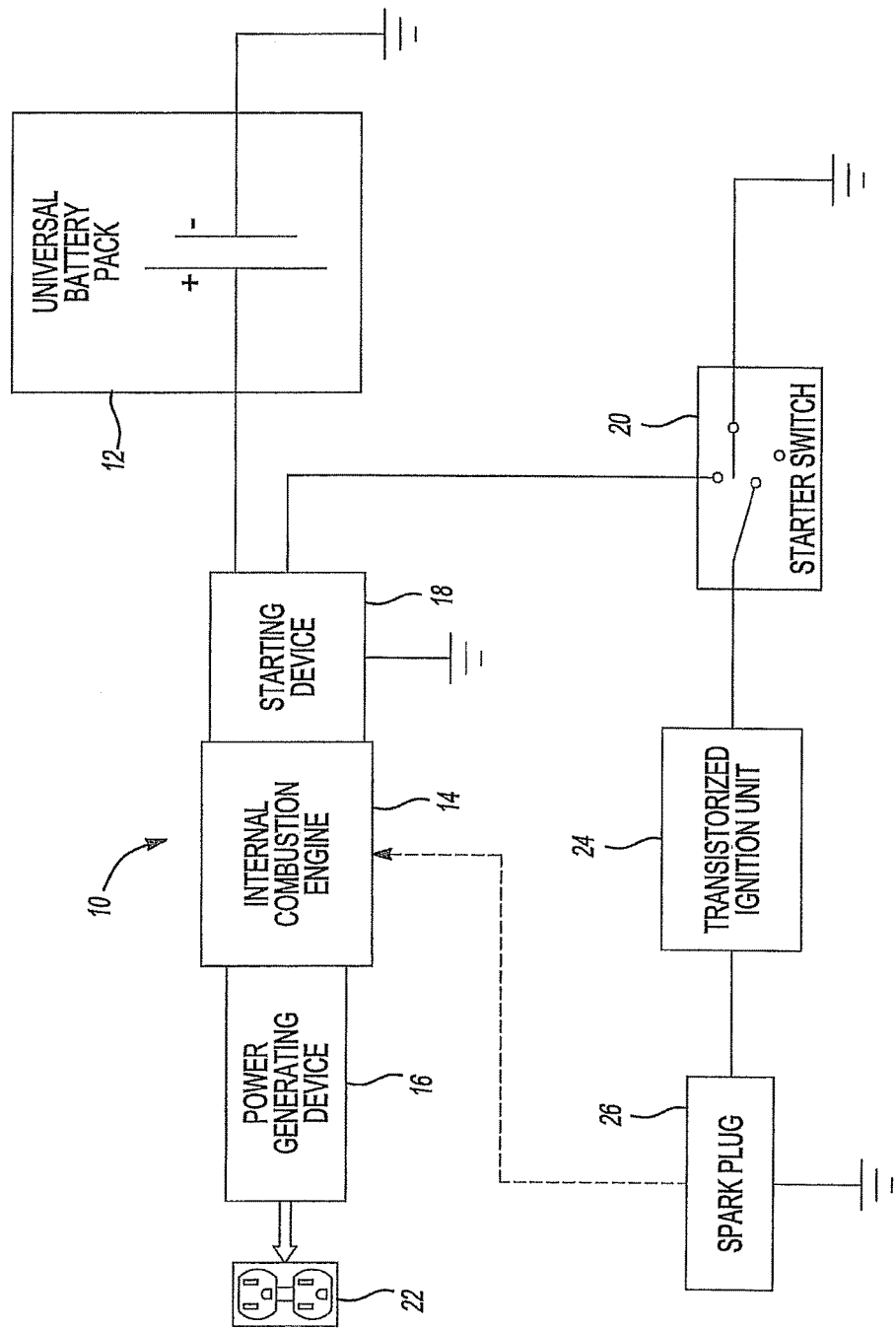
FIG. 1 is a simplified block diagram of a portable generator system, wherein the system utilizes a portable universal battery pack to start an internal combustion (IC) engine of the generator system.

FIG. 1 is a simplified block diagram of a portable generator system 10. The generator system 10 utilizes a portable universal battery pack 12 to start an internal combustion (IC) engine 14 that turns a power generating device 16. System 10 additionally includes a starting device 18 connected to universal battery pack 12 and a starter switch 20. Starter switch 20 is connected to a transistorized ignition unit 24, which is in turn connected to a spark plug 26. Starting device 18 is used to turn IC engine 14 at a rate sufficient to start IC engine 14. Once IC engine 14 is started, IC engine 14 drives power generating device 16, whereby power generating device 16 outputs AC power usable by a load connected to an electrical outlet 22.

Figure 2:
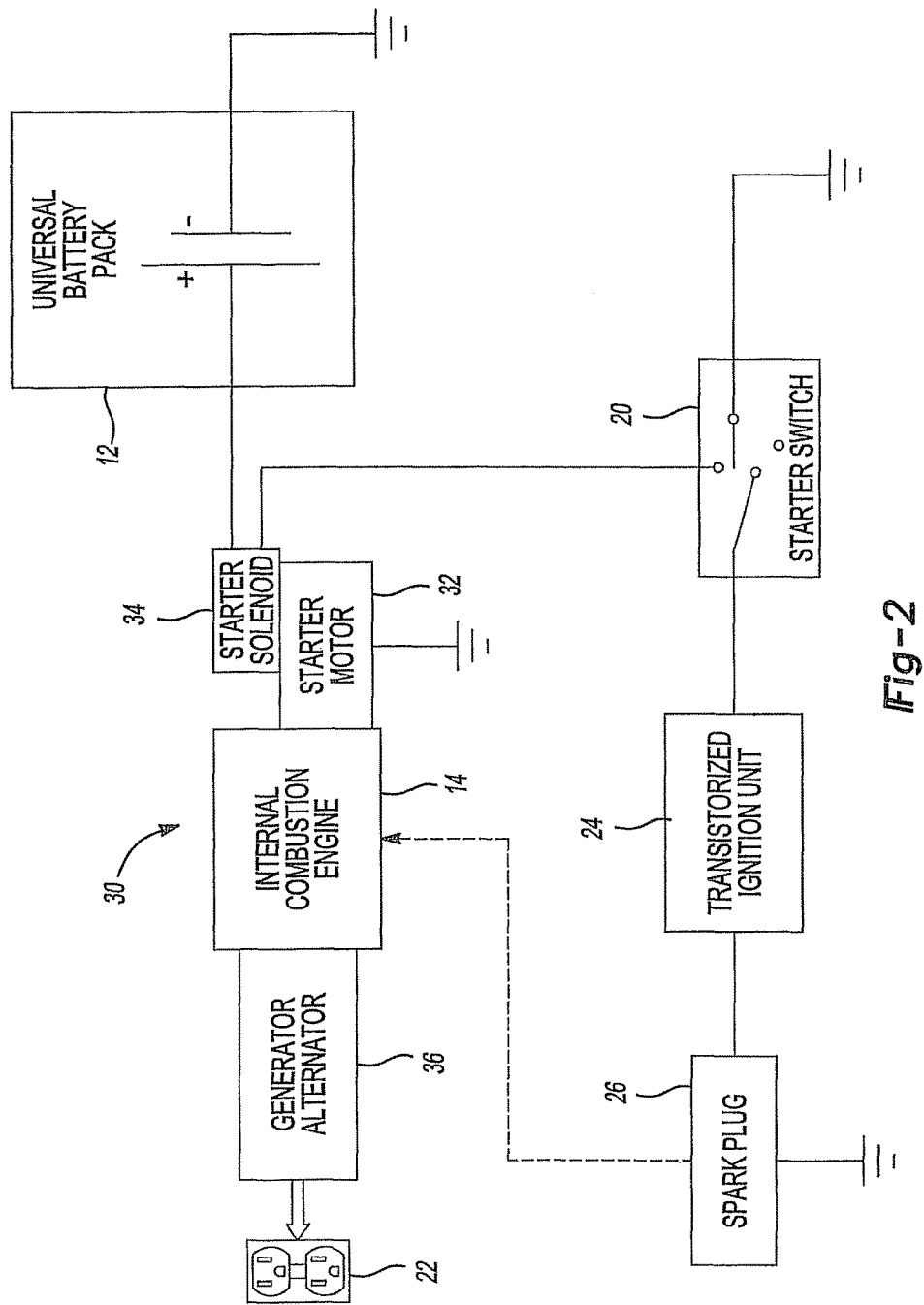
FIG. 2 is a simplified block diagram of an alternate embodiment of the portable generator system shown in FIG. 1.

FIG. 2 is a simplified block diagram of a portable generator system 30, which is an alternate embodiment of portable generator system 10 (shown in FIG. 1). In this embodiment, starting device 18 comprises a starter motor 32 and a starter solenoid 34. Additionally, power generating device 16 is an alternator 36. System 30 utilizes portable universal battery pack 12 to start IC engine 14 that turns alternator 36. Starter solenoid 34 is connected to battery pack 12 and used to initially turn starter motor 32. Starter solenoid 34 is also connected to starter switch 20. Starter switch 20 has a 'Start' position, an 'On' position and an 'Off' position. When starter switch 20 is placed in the 'Start' position, universal battery pack 12 provides low current power to starter solenoid 34.

Providing low current to starter solenoid 34 turns on starter motor 32, thereby turning IC engine 14. Starter switch 20 is spring-loaded so that it returns to the 'ON' position upon successfully starting IC engine 14. In the 'ON' position starter switch 20 directs power from ignition unit 24 to spark plug 26. Each time spark plug 26 fires, spark is provided to IC engine 14, which is utilized to ignite a compressed fuel and air mixture present in a cylinder (not shown) during a compression cycle of IC engine 14. When IC engine 14 is running it turns alternator 36, which creates an output voltage usable to provide AC power at outlet 22.

Figure 3:
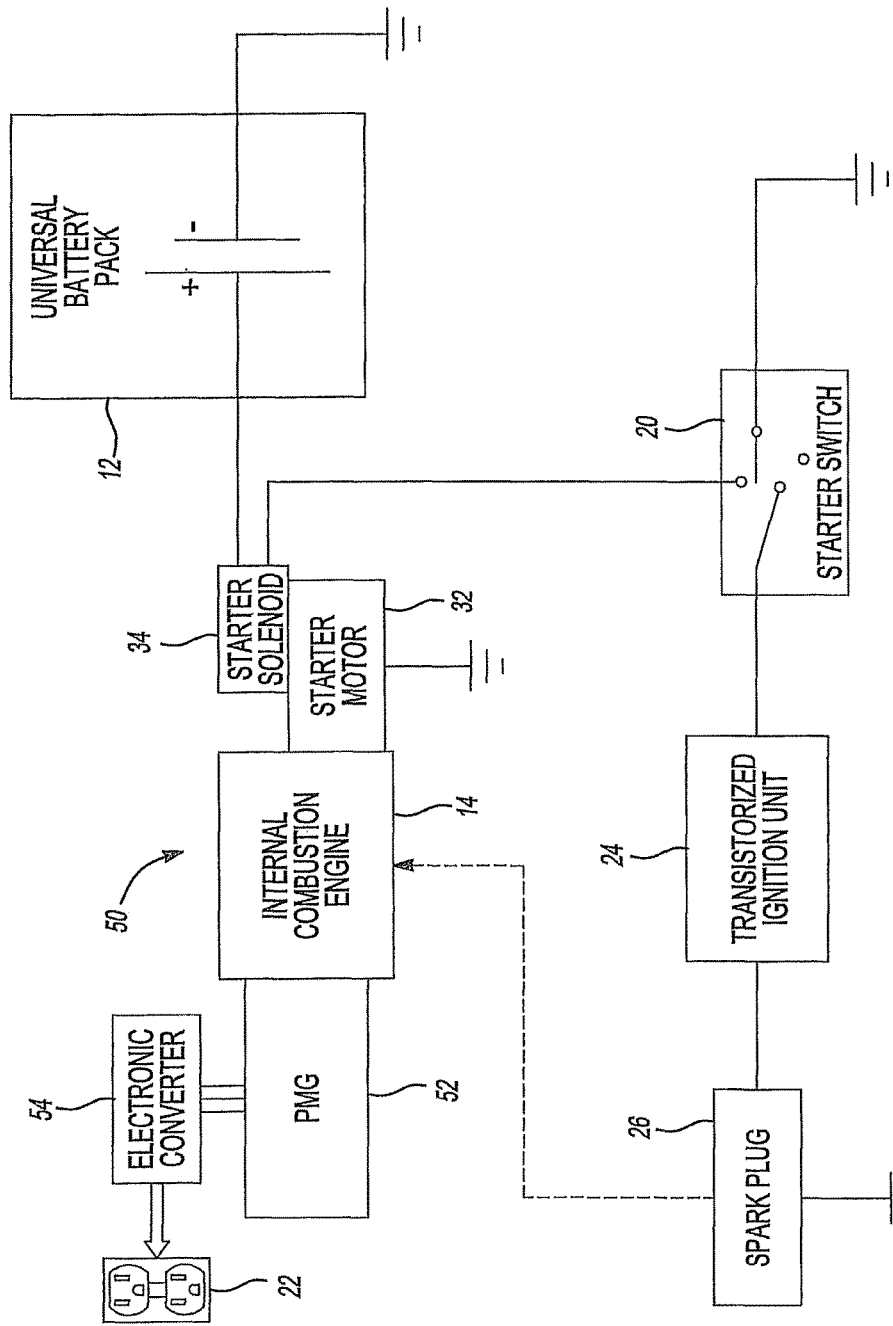
FIG. 3 is a simplified block diagram of another alternate embodiment of the portable generator system shown in FIG. 1 that utilizes a permanent magnet generator and electric converter to generate power.

FIG. 3 is a simplified block diagram of a portable generator system 50, which is an alternate embodiment of portable generator system 30 (shown in FIG. 1). In this embodiment, starting device 18 again comprises starter motor 32 and starter solenoid 34, while power generating device 16 comprises a permanent magnet generator (PMG) 52 and an electronic converter circuit 54. Generator system 50 utilizes portable universal battery pack 12 to start IC engine 14 that turns PMG 52, which is connected to electronic converter circuit 54. As described above in reference to FIG. 2, starter switch 20 has a 'Start' position, an 'On' position and an 'Off' position. When starter switch 20 is placed in the 'START' position, universal battery pack 12 provides low current power to starter solenoid 34 to start IC engine 14 as described above.

When IC engine 14 is running it turns PMG 52, which creates a 3-phase output. The 3-phase output is converted by the electronic converter circuit 54 to usable AC power that is provided to outlet 22. The electronic converter circuit 54 can be any suitable inverter circuit, such as the inverter circuit described in U.S. Pat. No. 6,608,401 issued Aug. 19, 2003 entitled Alternator/Inverter With Dual H-Bridge, herein incorporated by reference in its entirety.

Figure 4:
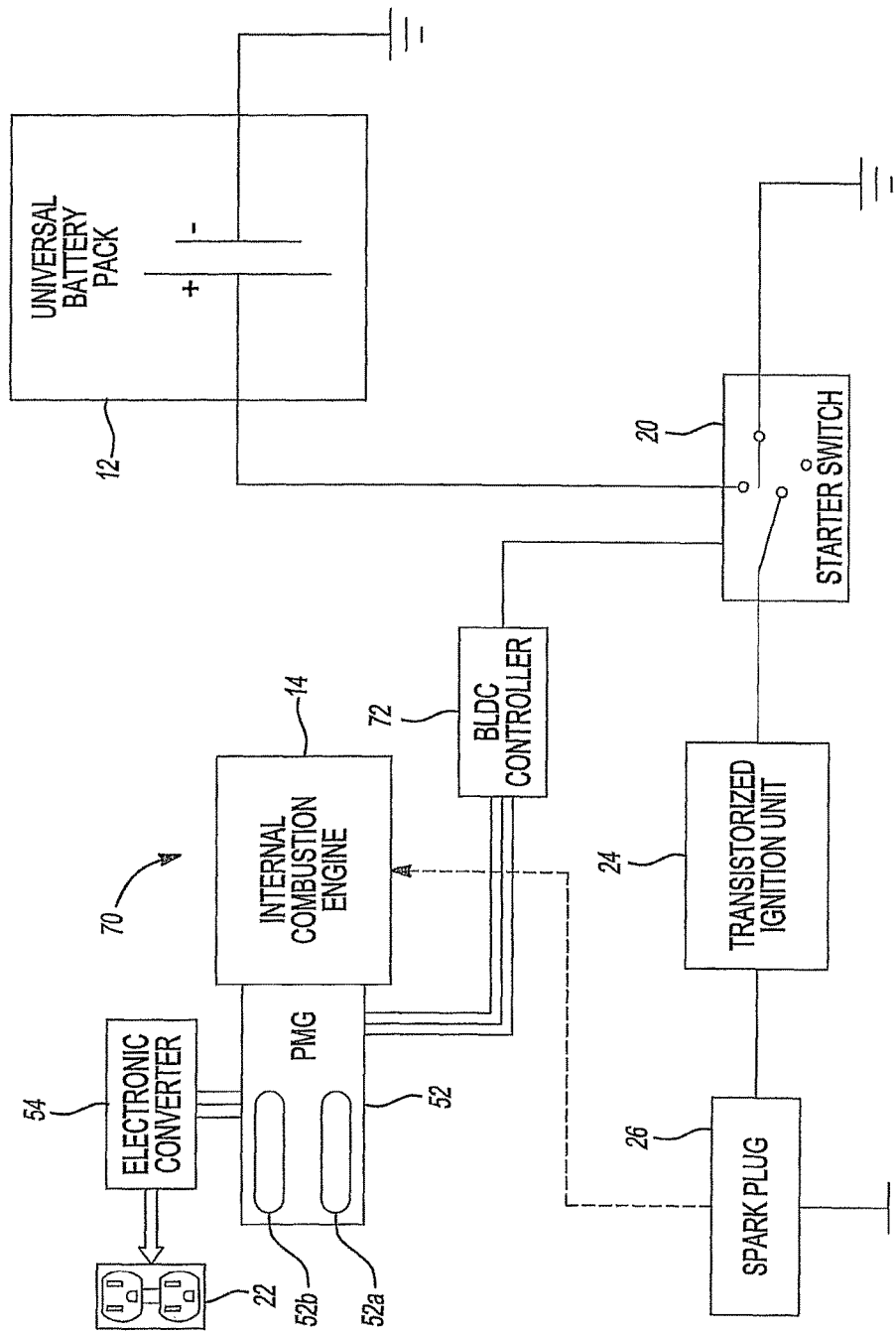
FIG. 4 is a simplified block diagram of yet another alternate embodiment of the portable generator system shown in FIG. 1 that utilizes a permanent magnet generator to start the IC engine.

FIG. 4 is a simplified block diagram of a portable generator system 70, which is yet another alternate embodiment of portable generator system 10 (shown in FIG. 1). In this embodiment, power generating device 16 again comprises PMG 52 and electronic converter circuit 54. Additionally, starting device 18 also comprises PMG 52. PMG 52 includes two sets of 3-phase windings, referred to herein as first windings 52a and second windings 52b. First and second windings 52a and 52b enable PMG 52 to be used as a starter motor for starting IC engine 14, i.e. 'Motor Mode', and a generator for generating AC power output to outlet 22, i.e. 'Generator Mode'. One set of first and second windings 52a, 52b is used to drive PMG 52 as an electric motor when PMG 52 is in the 'Motor Mode' and the other set of first and second windings 52a, 52b is used to generate power when PMG 52 is in the 'Generator Mode.'

Generator system 70 utilizes PMG 52 to start IC engine 14 and to generate AC power. Universal battery pack 12 is connected to PMG 52 via a brushless DC (BLDG) controller 72 and the starter switch 20. When PMG 52 is used in the 'Starter Mode', starter switch 20 is placed in the 'Start' position. Battery pack 12 then provides power to PMG 52, via BLDC controller 72, to drive PMG 52 as a brushless DC motor so that PMG 52 turns IC engine 14. As IC engine 14 turns, ignition unit 24 fires spark plug 26 at predetermined intervals. Each time spark plug 26 fires, spark is provided to IC engine 14. The spark is utilized to ignite the compressed fuel and air mixture present in the cylinder during the compression cycle of IC engine 14. Once the IC engine 14 is started, starter switch 20 is placed back to the 'On' position and IC engine 14 continues running. PMG 52 then stops functioning as a starter motor and switches to the 'Generator Mode'. Thus, PMG 52 begins to function as a generator. As described above in reference to FIG. 3 PMG 52 creates a 3-phase output that is converted by the electronic converter circuit 54 to usable AC power that is provided to outlet 22.

Figure 5:
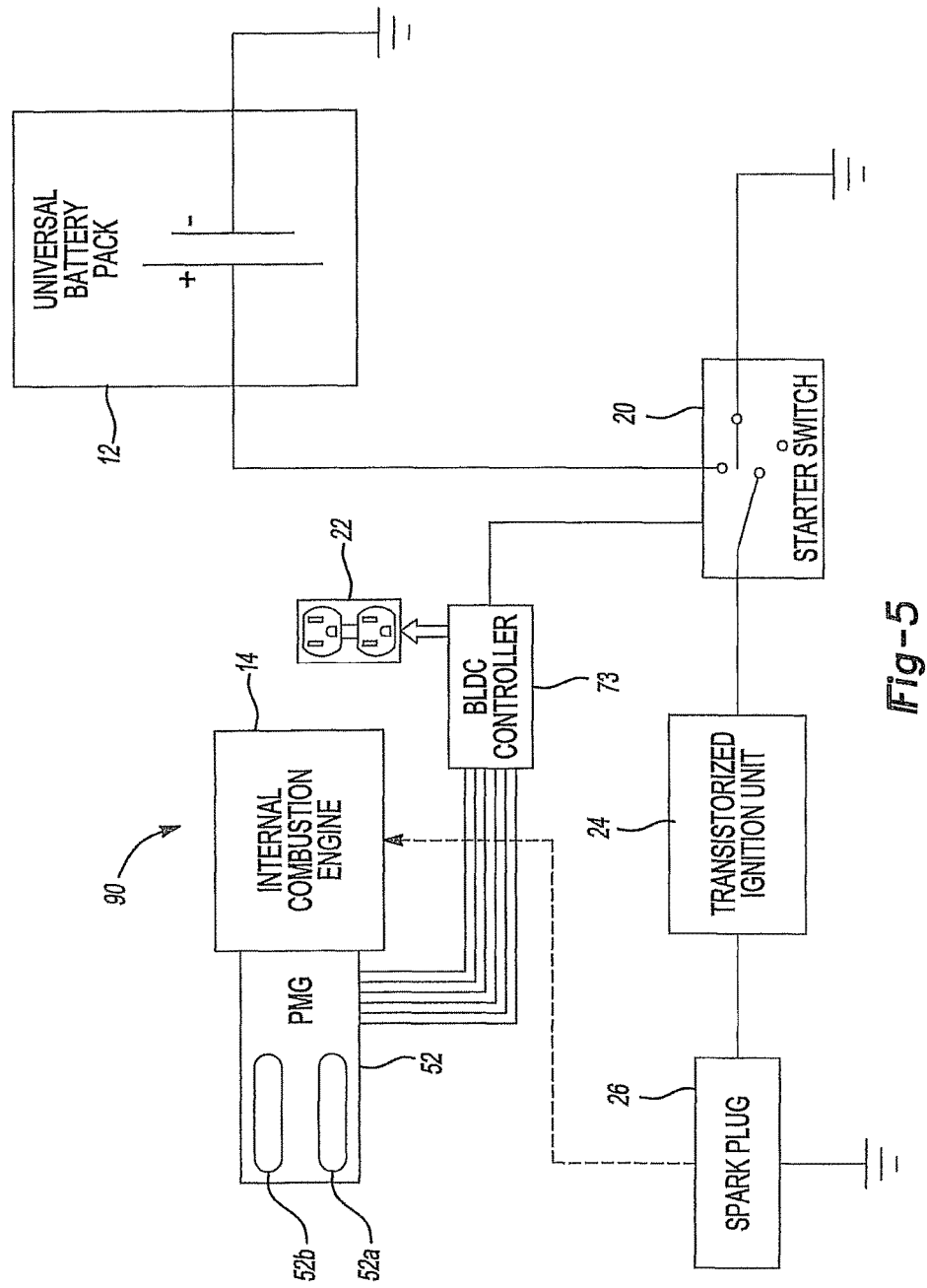
FIG. 5 is a simplified block diagram of still yet another alternate embodiment of the portable generator system shown in FIG. 1, that utilize the permanent magnet generator to start the IC engine.

FIG. 5 is a simplified block diagram of a portable generator system 90, which is still yet another alternate embodiment of portable generator system 10 (shown in FIG. 1). As in system 70, shown in FIG. 4, PMG 52 is used in the 'Motor Mode' to start IC engine 14 and used in the 'Generator Mode' to provide power to outlet 22. However, in this embodiment, the variable voltage, variable frequency power output by PMG 52 is converted to usable AC power, i.e., constant voltage, constant frequency AC power, utilizing BLDC controller 73.

Generator system 90 utilizes PMG 52 to start IC engine 14 and to generate AC power. As described above in reference to FIG. 4, universal battery pack 12 provides power to PMG 52, via BLDC controller 73, such that PMG 52 starts IC engine 14. Once the IC engine 14 is started, starter switch 20 is placed back to the 'On' position and IC engine 14 continues running. PMG 52 then stops functioning as a starter motor and switches to the 'Generator Mode' to provide power to outlet 22. More specifically, PMG 52 creates a 3-phase output. The 3-phase output is converted to AC power by a controlled full wave bridge rectifier circuit and H-bridge bridge circuit included in BLDC controller 73.

Figure 6:
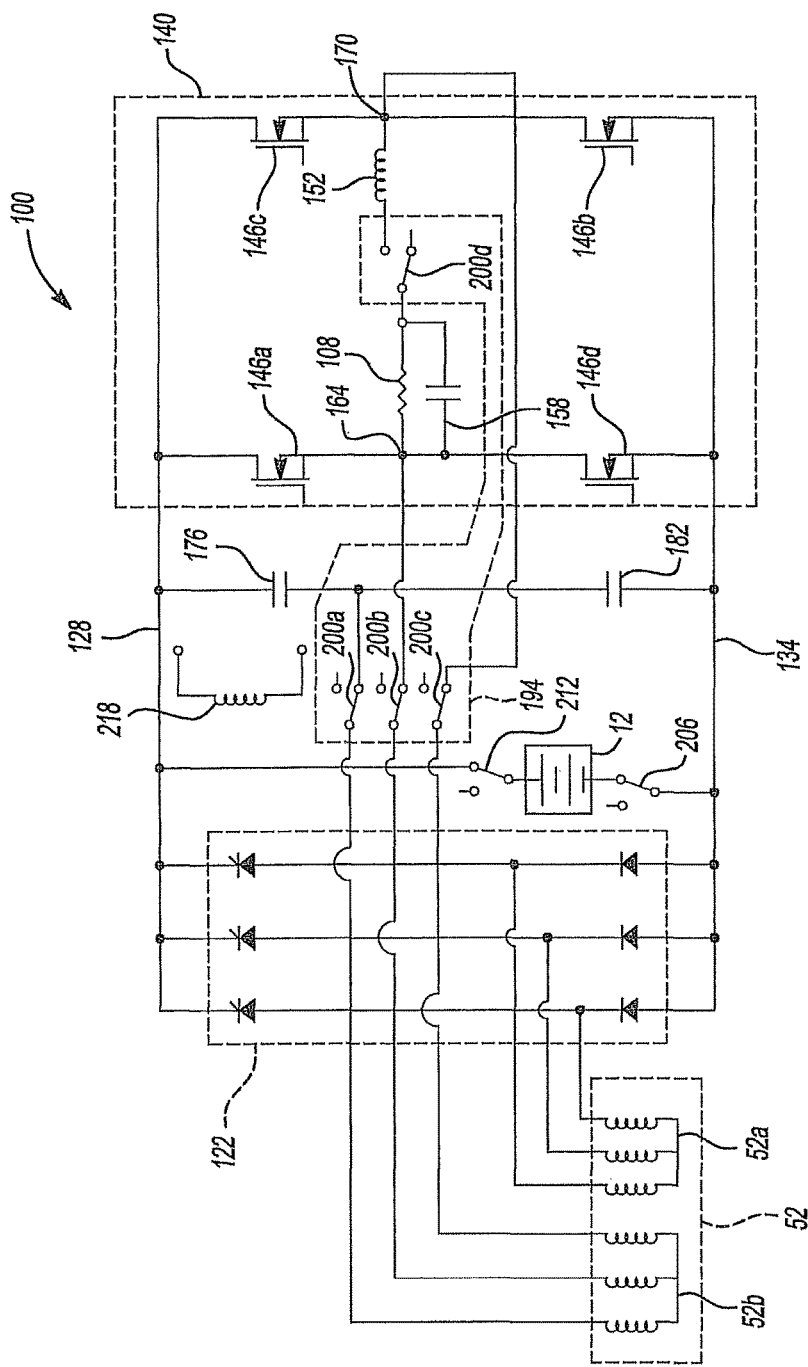
FIG. 6 is a simplified schematic drawing of an embodiment of a brushless DC drive circuit used in the portable generator system shown in FIG. 5.

FIG. 6 is an embodiment of a brushless DC drive circuit 100 included in BLDC controller 73 (FIG. 5). Circuit 100 is ideally suited for use in a portable electric power generator, however, it will be appreciated that the present disclosure is not so limited and may find utility in a variety of related power generating applications.

Circuit 100 is electrically connected to PMG 52 (shown in FIG. 5) which is a three phase permanent magnet generator having first 3-phase windings 52a for running PMG 52 in the 'Generator Mode' and second 3-phase windings 52b for running PMG 52 in the 'Motor Mode'. In 'Generator Mode', PMG 52 outputs electrical power, such as to a load 108, while in 'Motor Mode' PMG 52 rotates IC engine 14 (shown in FIG. 5).

In 'Generator Mode', PMG 52 provides a three phase AC output signal to a controlled full wave bridge rectifier circuit 122. Rectifier circuit 122 is coupled across DC bus lines, or rails, 128 and 134 that form a DC bus. Also coupled across the DC bus is a full H-bridge circuit 140 comprising four identical power switching devices 146a-146d. An inductor 152 and a capacitor 158 are coupled across nodes 164 and 170 and form an LC filter for attenuating harmonic distortion in the output waveform generated by the H-bridge 140. Each of the power switching devices 146a-146d may comprise a variety of suitable power switching components, for example field effect transistors (FET's) or insulated gate bi-polar transistors (IGBT's). A pair of DC bus capacitors 176 and 182 are also coupled in series across the DC bus rails 128 and 134. Although the DC bus capacitance is shown to only include the pair of capacitors 176 and 182, it is envisioned that the DC bus capacitance could comprise any even number of capacitors. One phase of second windings 52b is connected at a center node between even numbers of the DC bus capacitors.

Load 108 is coupled in parallel across capacitor 158. Additionally, DC drive circuit 100 includes a 4-pole relay switch 194 that includes four poles 200a-200d and a coil 218. Universal battery pack 12 is removably inserted in series with key switches 206 and 212 between DC bus lines 128 and 134.

In starting operation, with 4-pole, double throw switch 194 de-energized, as shown, load 108 is disconnected and the three phases of second windings 52b are connected to center nodes 164 and 170 of H-bridge 140 and a center node 224 of the DC bus capacitance. With key switches 206 and 212 turned to a 'Start' position, portable universal battery pack 12 is connected across DC bus rails 128 and 134 and power switching devices 146a-146d are sequenced to run PMG 52 in the 'Motor Mode'. In this mode PMG 52 acts as a motor to turn IC engine 14. The power switching devices 146a-146d are sequenced by signals from a Hall effect position sensor (not shown) and coupled, via an AND gate (not shown), with a pulse width modulated (PWM) signal. Power switching devices 146a-146d create two phases of a three phase drive signal used to drive PMG 52 as a brushless DC motor with capacitors 176, 182 creating the third phase.

The PWM signal is based on the rated voltage output of universal battery pack 12. Thus, the rated voltage output of universal battery pack 12 need not conform to one predetermined DC voltage. The rated voltage output of universal battery pack 12 can be, for example, a voltage preferably of 12 volts or greater, preferably ranging from 12 to 18 volts. For example, a NiCd universal battery pack of 12, 14.4 or 18 volts can be utilized with circuit 100 and regardless of the output voltage, the effective voltage provided to PMG second windings 52b will be approximately equal to that of a 12 volt battery.

When the DC bus voltage exceeds the initial voltage of universal battery pack 12, for example 20 volts or greater, relay coil 218 is energized to disconnect second windings 52b from H-bridge circuit 140 and bus capacitors 176 and 182 and to connect load 108 to the output of H-bridge circuit 140. Once second windings 52b are disconnected from H-bridge circuit 140, PMG 52 is switched to 'Generator Mode'. In 'Generator Mode', PMG 52 outputs variable voltage, variable frequency AC power, via first windings 52a. Full wave bridge rectifier circuit 122 and H-bridge circuit 140 convert the AC power to a constant voltage, constant frequency output, for example a 120 VAC, 60 Hz, that is output from H-bridge circuit 140 to load 108.

Utilizing universal battery pack 12 and PMG 52 to provide starting power to IC engine 14 greatly reduces the size and weight of generator system 90. It is envisioned that universal battery pack 12 can be any universal battery pack commonly used in many cordless power tools, for example the DEWALT® XR PLUS (Extended Run Time Plus) line of batteries.

Figure 7:
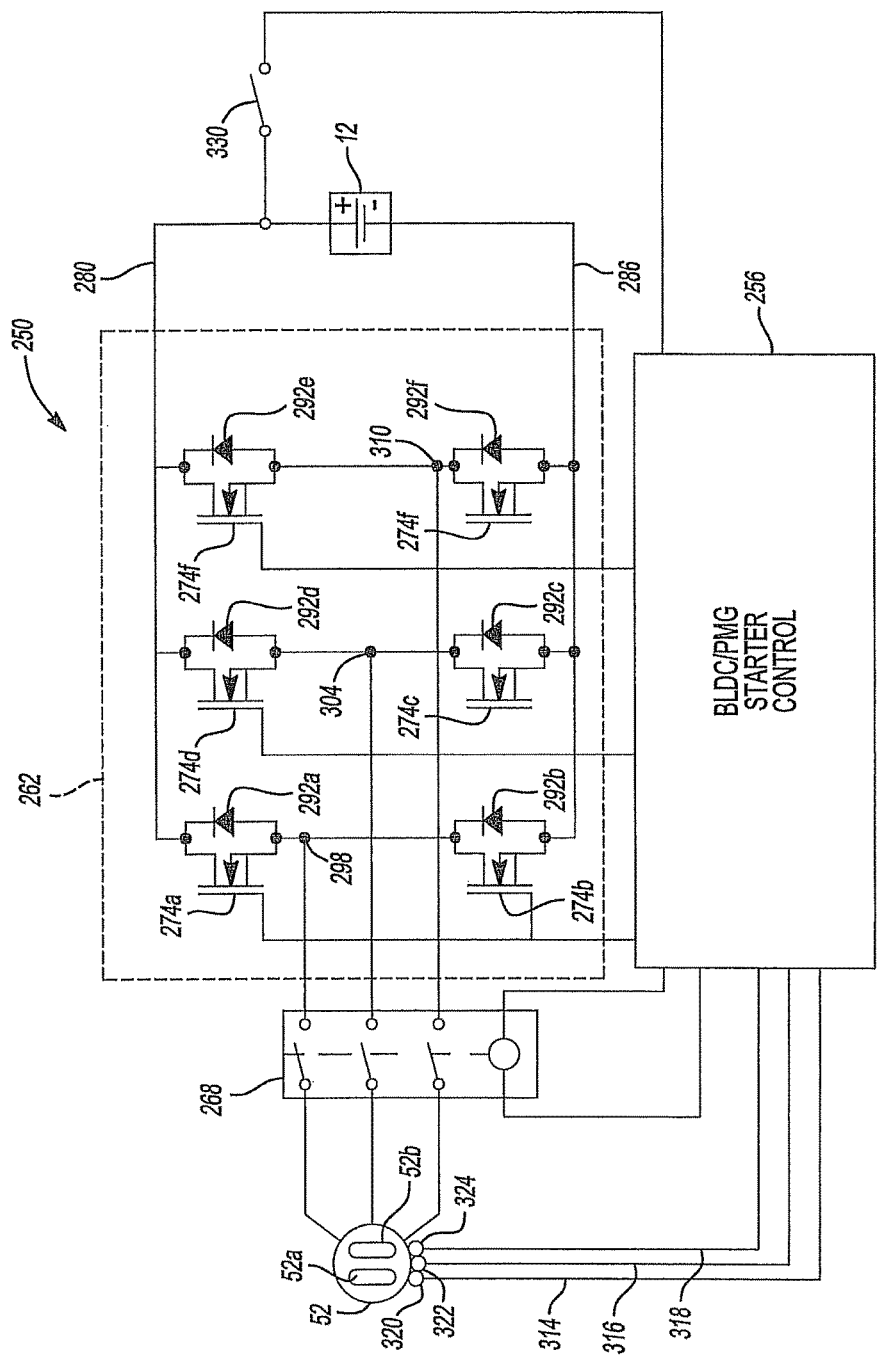
FIG. 7 is a simplified schematic drawing of another embodiment of a brushless DC drive circuit used in the portable generator system shown in FIG. 4.

FIG. 7 is a simplified schematic drawing of a preferred embodiment of a brushless DC motor drive circuit 250 included in BLDC controller 72 used in portable generator system 70 (shown in FIG. 4). Drive circuit 250 is used to drive PMG 52 as a brushless DC motor to start IC engine 14 (shown in FIG. 4). Circuit 250 is a low voltage DC to AC 3-phase inverter that incorporates a Brushless DC/Permanent Magnet Generator (BLDC/PMG) starter control 256, and is powered directly by universal battery pack 12. DC drive circuit 250 includes a power stage 262 that is electrically connectable to PMG 52 through a 3-pole relay switch 268. Power stage 262 includes six identical power switching devices 274a-274f coupled across DC bus lines, or rails, 280 and 286.

Power switching devices 274a and 274b are connected in series between bus lines 280 and 286 having a center node 298 electrically connected to one pole of relay 268. Power switching devices 274c and 274d are connected in series between bus lines 280 and 286 having a center node 304 electrically connected to a second pole of relay 268. Power switching devices 274e and 274f are similarly connected in series between bus lines 280 and 286 having a center node 310 electrically connected to a third pole of relay 268. Six diodes 292a-292f are respectively connected in parallel with switching devices 274a-274f, between bus lines 280 and 286. Switching devices 274a-274f may comprise a variety of suitable power switching components, for example field effect transistors (FET's), insulated gate bi-polar transistors (IGBT's), or metal oxide silicon field effect transistors (MOSFET's).

The 3-phase PMG 52 includes position sensors 320, 322 and 324, which are illustratively Hall effect sensors, that are connected to BLDC/PMG starter control 256 by lines 314, 316 and 318, respectively. Position sensors 320, 322, 324 sense the position of a rotor (not shown) of PMG 52. Additionally, DC drive circuit 250 includes a momentary starter switch 330 that controls the flow of current from universal battery pack 12 to BLDC/PMG starter control 256.

In operation, initially IC engine 14 is at rest. The IC engine 14 is started by a user closing momentary start switch 330. The BLDC/PMG starter control 256 will then become energized by universal battery pack 12. Provided the position sensors 320, 322 and 324 indicate that either the speed of IC engine 14 or the speed of PMG 52 is less than a predetermined value, e.g. 600 rpm, 3-pole relay switch 268 will be energized by BLDC/PMG starter control 256, thereby connecting the 3-phase power stage 262 to PMG 52. Utilizing information from position sensors 320, 322 and 324, the switching devices 274a-274f are turned on and off by BLDC/PMG starter control 256. The switching of switching devices 274a-274f electronically commutates second 3-phase windings 52b within PMG 52 to drive PMG 52 as a brushless DC motor to rotate IC engine 14 to start it.

Thus, when PMG 52 is in 'Motor Mode', IC engine 14 will be turned by PMG 52 acting as a motor and will accelerate up to a speed to start IC engine 14. Once IC engine 14 has started, PMG 52 is driven past a predetermined maximum speed, e.g. 600 rpm, and 3-pole relay switch 268 will then be de-energized, thereby disconnecting power stage 262 from PMG 52. Disconnecting power stage 262 avoids overdriving universal battery pack 12 and supplying excessive voltage to switching devices 274a-274f. Once the starting operation is complete, momentary starter switch 330 is opened.

BLDC/PMG starter control 256 can be microprocessor based to simplify the electronic circuitry and to provide additional control features. Additional control features may include setting a maximum cranking time, e.g. 5 seconds, to avoid damage if momentary starter switch 330 is held closed for too long, or not attempting starting of IC engine 14 when universal battery pack 12 does not have sufficient voltage to turn or start IC engine 14. Further control features provided by a microprocessor based BLDC/PMG starter control 256 may include speed detection and control of 3-pole relay switch 268 to avoid overdriving universal battery pack 12 and power stage 262. Even further control features may include setting an upper starting speed of PMG 52 regardless of the voltage of universal battery pack 12 by utilizing pulse width modulation control of switching devices 274a-274f above a minimum speed.

In an alternate embodiment, PMG 52 includes a single set of tapped windings. In this embodiment, the first windings 52a comprise the full windings, which are used to generate AC power in the 'Generator Mode'. The second windings 52b comprise the tapped portion of the windings, which are used to drive PMG 52 as a motor in the 'Motor Mode' to start the IC engine 14.

Although the foregoing embodiments have been shown and described in connection with a portable generator using a single PMG and a single alternator/inverter circuit, or a single brushless DC drive circuit, it should be understood that the portable generators can utilize a pair of PMG's and a pair of alternator/inverter circuits. Alternatively, the portable generators can use a pair of PMG's with a pair of brushless DC motor drive circuits, such as that described in U.S. Pat. No. 6,665,158 issued Dec. 16, 2003 entitled Alternator/Inverter With Dual H-Bridge and Automatic Voltage Regulation, herein incorporated by reference in its entirety.

It should be understood that the disclosure of the present application is further applicable to all types of small IC engines, for example a lawnmower engine. Thus, the scope of the disclosure should not be construed as being limited only to portable generators.

Figure 8:
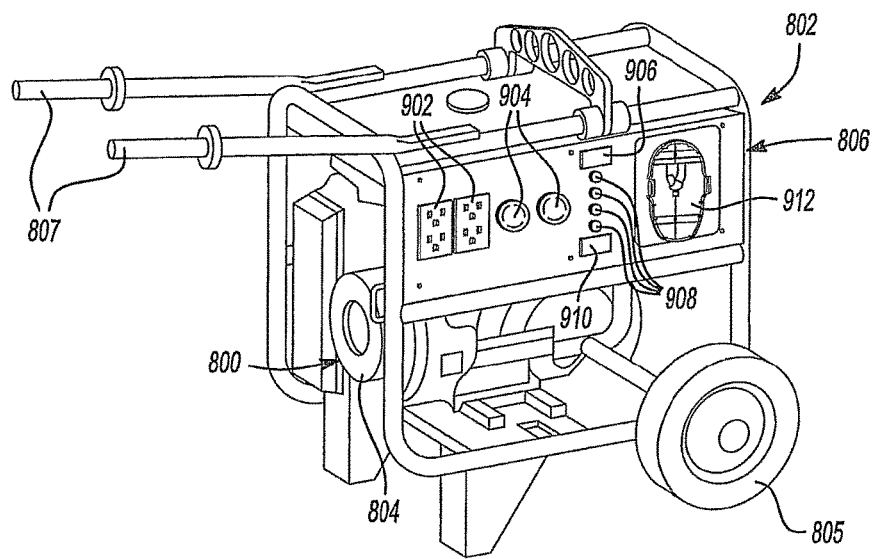
FIG. 8 is a side perspective view of a portable generator.

FIG. 8 shows a portable generator 800 in accordance with an aspect of the present disclosure. As used herein, a portable generator has an electric generator device for generating AC power that is driven by an internal combustion engine and is sufficiently light that it can be manually moved from one place to another. Portable generator 800 includes a frame 802 that supports an internal combustion engine 804. Frame 802 may illustratively support wheels 805 (only one of which is shown in FIG. 8) and include handles 807 to facilitate manually moving portable generator 800. An electric generator device (hidden from view in FIG. 8) is coupled to an output shaft of internal combustion engine 804. The electric generator device generates AC power, such as has been described above. The AC power may illustratively be 120 VAC (or 10 or 115 VAC) and may also illustratively be 240 VAC (or 220 or 230 VAC). It may be 60 Hz, or may be 50 Hz.

Figure 9:
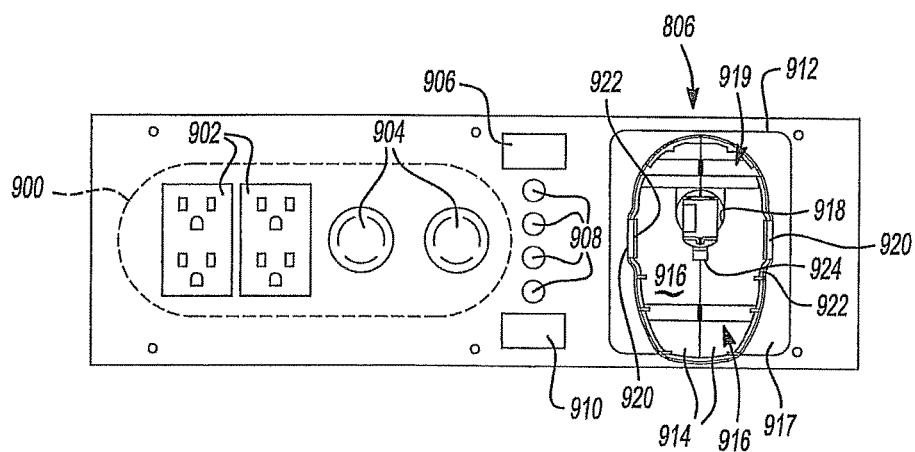
FIG. 9 is a front view of a control panel of the portable generator of FIG. 8.
Figure 10:
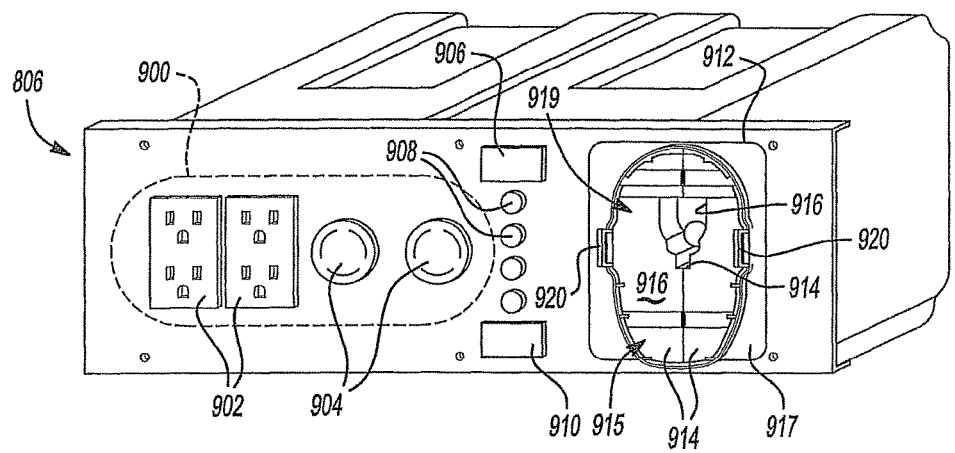
FIG. 10 is a front perspective view of the control panel of FIG. 9.

Portable generator 800 further includes a control panel 806, shown in more detail in FIGS. 9 and 10. Referring to FIGS. 9 and 10, control panel 806 includes AC outlets 900. AC outlets 900 illustratively include ground fault interrupter outlets 902 and twist-lock outlets 904. Control panel 806 also includes on/off/start switch 906, circuit breakers 908, and idle speed control switch 910. Control panel 806 further includes battery receptacle 912 electrically coupled to an electrically powered starting device for starting internal combustion engine 804, such as the starting devices described above.

Figure 11:
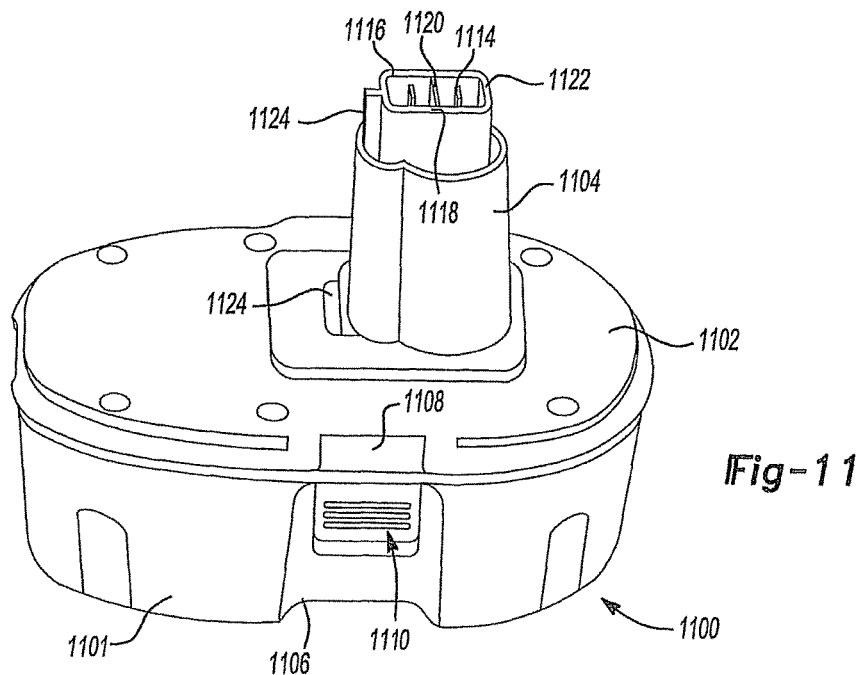
FIG. 11 is a side perspective view of a battery pack.
Figure 15:
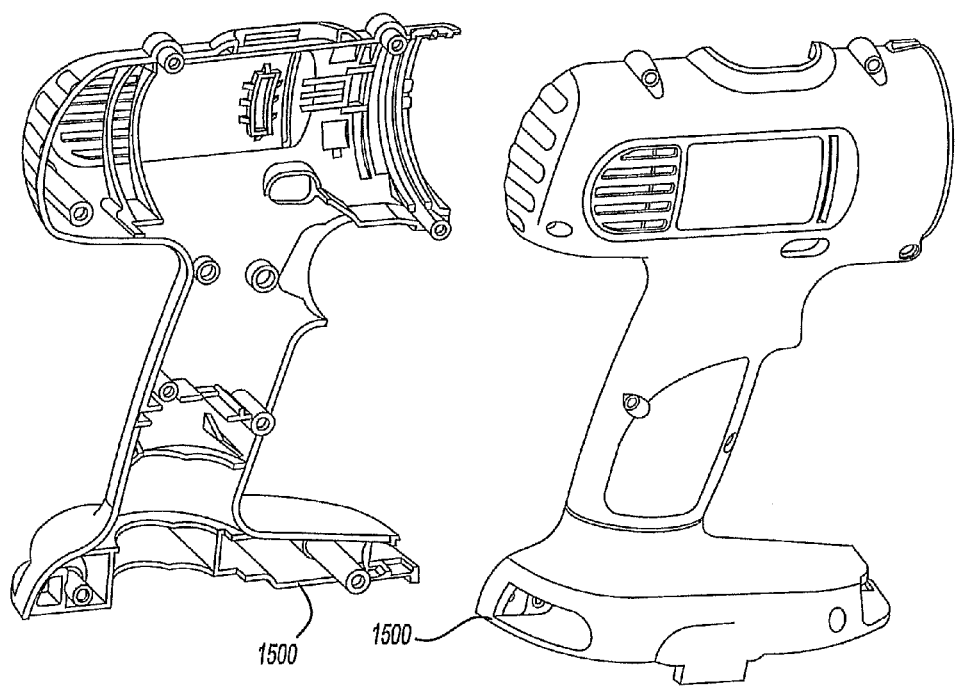
FIG. 15 is a side perspective view of housing halves of a cordless drill.

Battery receptacle 912 may illustratively be a "foot" of a cordless power tool that receives a battery pack, such as battery pack 1100 (FIG. 11). As used herein, a "foot" of a cordless power tool is that portion of the power tool, typically part of the power tool's housing, that is configured to receive a battery pack. For example, battery pack 1100 may be a battery pack for the DEWALT® series of 18 volt cordless power tools and battery receptacle 912 would then illustratively be materially the same as the foot of these power tools, such as the DEWALT® DW959K-2 drill. FIG. 15 shows housing halves 1500 of the DEWALT® DW959K-2 drill, the lower portions of which comprise the foot of this cordless power tool. It should be understood, however, that battery receptacle 912 could be the foot of any cordless power tool that uses a removable battery pack.

With reference to FIGS. 9-12, battery receptacle 912 illustratively includes housing halves 914 mated together to form a housing 915. A collar 917, illustratively a rectangular shaped collar, surrounds housing 915 and includes screw posts 1200 (only one of which is shown in FIG. 12) for receiving screws which secure collar 917 to control panel 806. Housing 915 includes a base portion 919 having an outer plate 916 that conforms to an upper plate 1102 of battery pack 1100 (FIG. 11) and a columnar portion 1218 (FIG. 12) extending from base portion 919. Opposed flanges 1214 (FIG. 12) project outwardly from housing halves 914 at opposed edges of outer plate 916. Opposed flanges 1214 include slots 1216 therein that mate with inwardly extending projections 1300 (FIG. 13) of collar 917 to secure housing 915 to control panel 806 when collar 917 is secured to control panel 806.

Housing 915 has a bore or passageway 918 therein that conforms to a tower 1104 of battery pack 1100 that extends from a base 1101 of battery pack 1100. Battery receptacle 912 further includes opposed catches 920 at opposed sides of outer plate 916 which mate with latches 1106 (only one of which is shown in FIG. 11) of battery pack 1100. Catches 920 illustratively include slots 922 that receive projections 1108 of latches 1106 of battery pack 1100. It should be appreciated that latches 1106 of battery pack 1100 are spring latches in which buttons 1110 of latches 1106 are depressed to retract projections 1108 from slots 922 of catches 920. Housing 915 of battery receptacle 912 further includes a keyway 924 in outer plate 916 projecting from bore 918 that receives a key 1124 at the base of tower 1104 of battery pack 1100.

Battery receptacle 912 further includes a connector 1202 (FIG. 12) that mates with terminal block 1112 of battery pack 1100. Connector 1202 is electrically coupled to a starting device for internal combustion engine 804 in a manner similar to that described above. Terminal block 1112 of battery pack 1100 includes power terminals 1114, 1116, temperature sense terminal 1118 (which is connected to a temperature sensing element within battery pack 1100 such as a thermistor) and key 1120 surrounded by a rectangular wall 1122 having a key 1124 projecting outwardly from an end wall. Connector 1202 has corresponding power terminals 1204, 1206. Terminals 1204, 1206 are spaced from each other and have a space 1208 therebetween which receives temperature sense terminal 1118 and key 1120. Terminals 1204, 1206 are surrounded by a rectangular wall 1210. It should be understood that connector 1202 could have a female temperature sense terminal (not shown) if generator 800 includes circuitry to sense the temperature of battery pack 1100.

Housing halves 914 include opposed channels 1208 that receive opposed flanges of connector 1202 to mount connector 1202 in housing 915.

By providing on control panel 806 a battery receptacle 912 that is essentially a foot of a cordless power tool, a user of generator 800 can advantageously use the battery pack for the cordless power tool, such as battery pack 1100, in starting generator 800. Illustratively, battery pack 1100 is not charged by generator 800. Rather, when battery pack 1100 needs charging, it is charged in an external charger, such as the external charger that is typically provided with the cordless power tool when the user purchases the cordless power tool.

By using a battery pack from a cordless power tool, such as battery pack 1100, generator 800 does not require its own battery, which is typically a lead acid type of battery. The user need not purchase the lead acid battery, avoids the need to maintain such a lead acid battery, and generator 800 is lighter since the weight of the lead acid battery is eliminated.

FIG. 14 shows another aspect of the disclosure. In the embodiment of FIG. 14, a portable electric generator 1400 includes a frame 1402 that supports an internal combustion engine 1404. The frame 1402 may illustratively support wheels 1401 (only one of which is shown in FIG. 8) and include handles 1403 for facilitating moving generator 1400. An electric generator device (hidden from view in FIG. 14) is coupled to an output shaft of internal combustion engine 1404. The electric generator device generates AC power, such as has been described above. The AC power may illustratively be 120 VAC (or 110 or 115 VAC) and may also illustratively be 240 VAC (or 220 or 230 VAC). It may be 60 Hz, or may be 50 Hz. Generator 1400 also includes a control panel including AC outlets (not shown in FIG. 14).

Generator 1400 further includes enclosure 1406 mounted to frame 1402. Enclosure 1406, which may illustratively be a water resistant enclosure, includes a rectangular tub shaped base portion 1408 and hinged lid 1410. Base portion 1408 of enclosure 1406 includes battery receptacle 1412, charger 1414 and AC outlet 1416. Battery receptacle 1412 is configured to receive a battery pack from a cordless power tool, such as battery pack 1100. In this regard, battery receptacle 1412 may be configured to receive a tower type of battery pack, such as battery pack 1100, as is charger 1414. As such, battery receptacle 1412 may illustratively have a configuration similar to battery receptacle 912 described above. Battery receptacle 1412 may alternatively be configured to receive a rail type of battery pack, such as battery pack 16 shown in U.S. Pat. No. 6,653,815, the disclosure of which is incorporated herein in its entirety by reference. As such, battery receptacle 1412 has a configuration similar to that on the foot of tool 10 of U.S. Pat. No. 6,653,815. That is, battery receptacle 1412 includes a pair of grooves that receives guide rails of the rail type battery pack. It also includes a connector configured to mate with the terminal block of the rail type battery pack.

Charger 1414 may illustratively be a stand alone charger such as the charger that is typically supplied with the power tool when the user purchases the power tool and is thus mounted in base portion 1408 of enclosure 1406 and plugged into AC outlet 1416 in enclosure 1406. Charger 1414 may illustratively be a multi-port charger having a plurality of ports to that charger 1414 can receive a plurality of battery packs 1100 at any one time to charge them simultaneously. Battery receptacle 1412 is electrically coupled to an electrically powered starting device for starting internal combustion 1404, such as the starting devices described above.

In use, a battery pack, such as battery pack 1100, from a cordless power tool is placed in battery receptacle 1412 and provides electrical power to start internal combustion engine 1404. Charger 1414 is used to charge one or more battery packs 1100. In this regard, once internal combustion engine 1404 is started, the battery pack 1100 in battery receptacle 1412 can be removed from battery receptacle 1412 and placed in charger 1414 to charge that battery pack 1100.

Internal combustion engine 1404 may have a pull start that can be used to start internal combustion engine 1404 as well as the electrical starter circuit described above. The pull start could then be used to start internal combustion engine 1404 when the battery pack 1100 is discharged. Battery pack 1100 can then be placed in charger 1414, charged, and then placed in battery receptacle 1412 to provide electrical power to the electrical starting device so that internal combustion engine can be electrically started.

Figure 16:
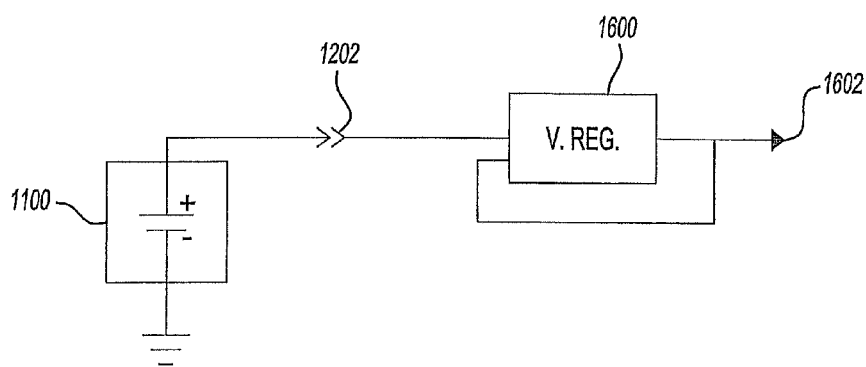
FIG. 16 is a schematic showing a voltage regulation circuit coupling the battery receptacle of the portable generator of FIG. 8 to the starting device of the portable generator of FIG. 8.

In an aspect, portable generator 800 is adapted to use universal battery packs having different voltages. More specifically with reference to FIG. 16, portable generator 800 includes a voltage regulation circuit 1600 that couples connector 1202 of battery receptacle 912 to the starting device for internal combustion engine 804, thus coupling the output of battery pack 1100 to the starting device for internal combustion engine 804 when battery pack 1100 is received in battery receptacle 912. Voltage regulation circuit 1600 illustratively provides at its output 1602 a set voltage at the appropriate level for the starting device for internal combustion engine 804. For example, if the starting device for internal combustion engine 804 utilizes a 12 volt DC starter motor, then voltage regulation circuit 1600 provides 12 volts DC at its output 1602. Voltage regulation circuit 1600 may illustratively monitor the voltage at its output 1602 and adjust its output accordingly to maintain the appropriate voltage level.

Voltage regulation circuit 1600 may be any known type of voltage regulation circuit. It may, for example, be a DC-DC converter in which the switching device(s) in the DC-DC converter are switched with a pulse width modulated signal and the duty cycle of the pulse width modulated signal is controlled to obtain the desired voltage level at output 1602. That is, voltage regulation circuit 1600 compares the voltage at its output 1602 with the desired voltage and adjusts the duty cycle of the PWM signal to maintain the output voltage constant at the desired level.

Voltage regulation circuit 1600 may illustratively be a buck converter type of DC-DC converter. Since buck converters are step-down converters, the starter motor used would then illustratively be a low voltage starter motor such that the voltage of the starter motor is no greater than the lowest voltage universal battery pack utilized. Alternatively, voltage regulation circuit 1600 may illustratively be a boost converter type of DC-DC converter. Since boost converters are step-up converters, the starter motor used would then illustratively be a higher voltage starter motor such that the voltage of the starter motor is no lower than the highest voltage universal battery pack utilized. Voltage regulation circuit 1600 may also illustratively be a buck-boost type of DC-DC converter which can both step-up and step-down. The starter motor utilized can then have a voltage that falls between the voltage of the highest voltage universal battery pack utilized and the voltage of the lowest voltage universal battery pack utilized. It should be understood that generator 1400 can similarly have voltage regulation circuit 1600.

Figure 17:
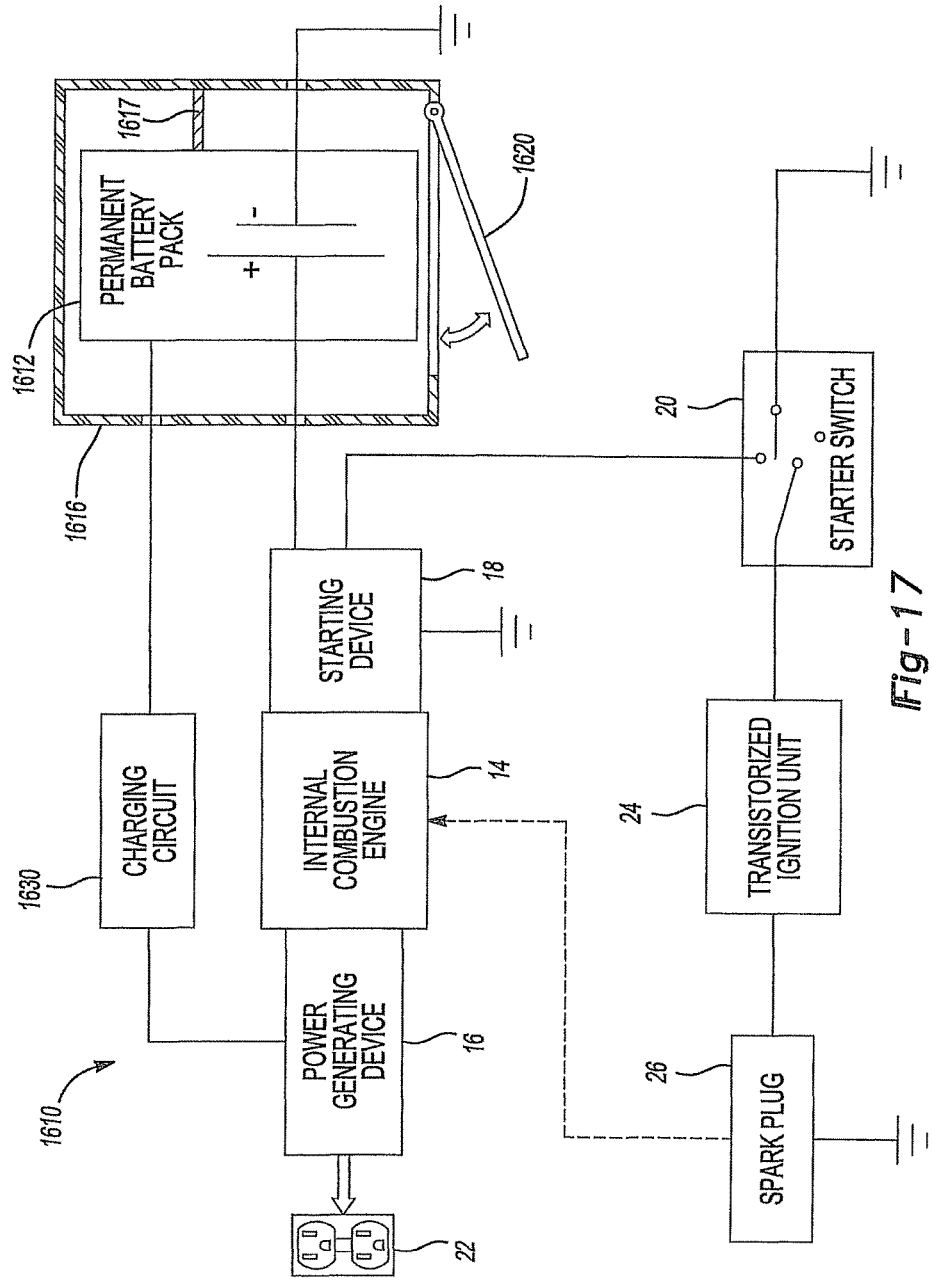
FIG. 17 is a simplified block diagram of a portable generator system, wherein the system utilizes a permanently mounted universal battery pack to start an internal combustion engine of the generator system.

With reference now to FIG. 17, a simplified block diagram of a portable generator system 1610, according to additional features is shown. The generator system 1610 utilizes a battery pack 1612 that is mounted to generator system 1610 with fastening devices, such as one or more hold down members shown representatively by 1617. Hold down member(s) 1617 may be removably affixed to housing 1616 such as with screws (not shown). Battery pack 1612 is thus "permanently mounted" in housing 1616 in the sense that it is not easily removable by hand. But battery pack 1612 can be removed and replaced in the event of failure, such as by unfastening hold down member(s) 1617, removing and replacing back pack 1612, and refastening hold down member(s) 1617. Battery pack 1612 may comprise a battery pack such as the battery pack 1100 (FIG. 11). Further, battery pack 1612 may comprise any suitable battery pack such as a NiCad universal battery pack of 12, 14.4 or 18 volts. In this example however, the battery pack 1612 is permanently mounted within a housing 1616 mounted in a frame of generator system 1610, such as frame 1402 (FIG. 14). The housing 1616 may define similar components as described with respect to the enclosure 1406 (FIG. 14), but in this example, the housing 1616 surrounds the battery pack 1612. The housing 1616 may include any suitable containment structure. It is contemplated that the housing 1616 may provide a removable portion, such as a door or cover plate 1620 to gain access to the battery pack 1612 in the event the battery pack 1612 needs to be replaced. In one example, the cover plate 1620 may be removably secured to the housing 1616, such as by fasteners (not shown).

According to an additional feature of the generator system 1610 shown in FIG. 17, a charging circuit 1630 may be provided. The charging circuit 1630 may be electrically connected to the power generating device 16 whereby the power generating device may provide the charging circuit with power to charge the battery pack 1612. It should be appreciated that while the charging circuit 1630 is specifically illustrated for use with the generator system 1610, it may easily be adapted for use in any of the generator systems disclosed herein. Charging circuit 1630 would illustratively be switched off during starting internal combustion engine 10 of generator system 1610 and then switched on after internal combustion engine 10 is started.

The generator system 1610 utilizes battery pack 1612 to start the IC engine 14 that turns the power generating device 16. The generator system 1610 may additionally include a starting device 18 connected to the battery pack 1612 and the starter switch. The starting device 18 may comprise any suitable starting device such as a starter motor and starter solenoid (see e.g., FIG. 2). The starter switch 20 may be connected to the transistorized ignition unit 24, which is in turn connected to a the spark plug 26. The starting device 18 may be used to turn the IC engine 14 at a rate sufficient to start the IC engine 14. Once the IC engine 14 is started, the IC engine 14 drives power generating device 16. The power generating device 16 may output AC power usable by a load connected to the electrical outlet. Concurrently, the power generating device may provide power to the charging unit 1630 to charge the battery pack 1612. The power generator device may alternatively comprise a generator alternator (FIG. 2).

Figure 18:
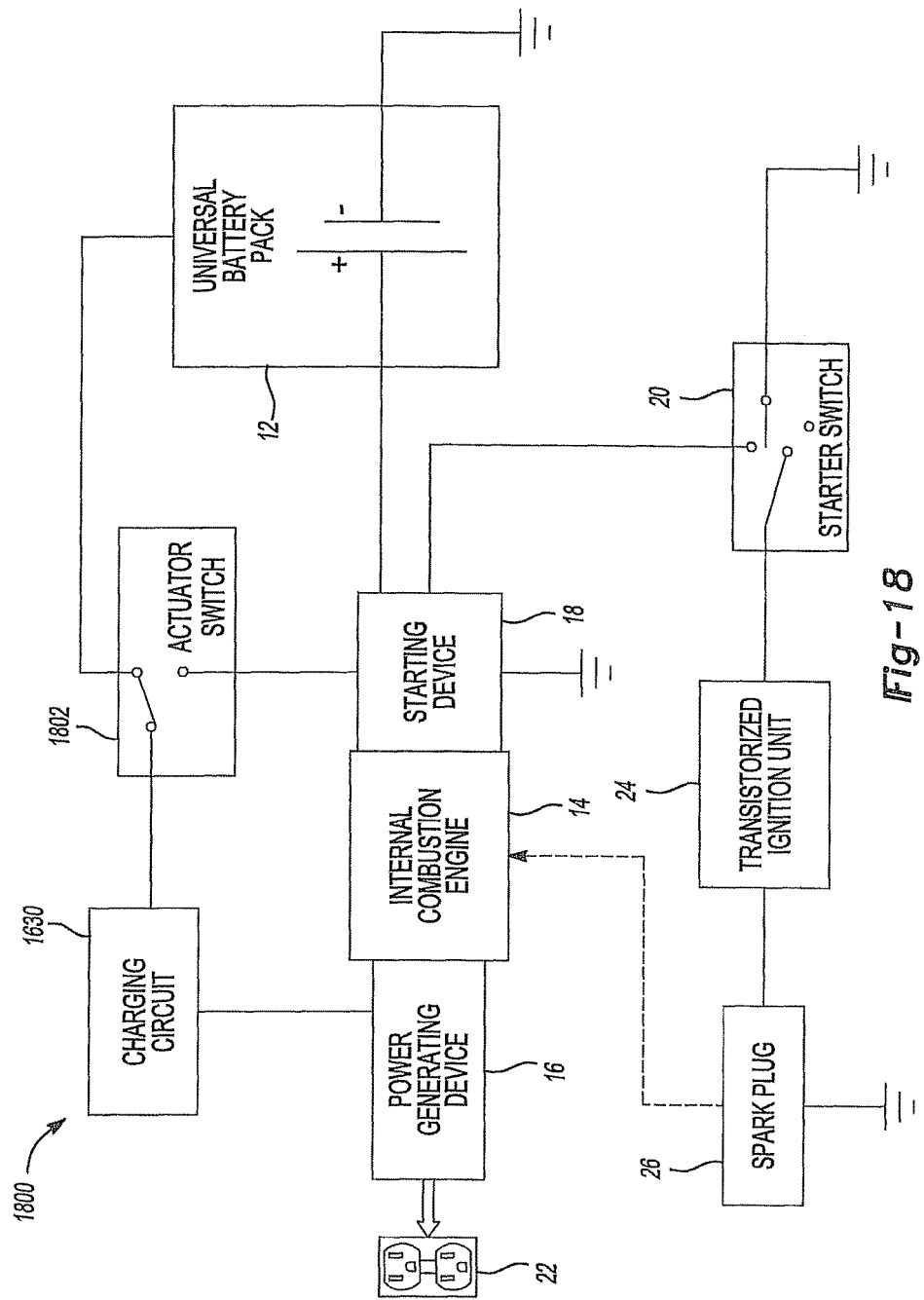
FIG. 18 is a simplified block diagram of a portable generator system, wherein the system utilizes an actuator switch for connecting a portable universal battery pack to either a starting device to start an internal combustion engine of the generator system or to a charging circuit for charging the portable universal battery pack.

With reference now to FIG. 18, a simplified block diagram of a portable generator system 1800, according to additional features is shown. The portable generator system 1800 includes an actuator switch 1802. The actuator switch 1802 is switchable to provide electrical connection between the universal battery pack 12 and the starting device 18 or between universal battery pack 12 and the charging circuit 1630. In this example, a user may place the universal battery pack 12 into the battery receptacle (such as battery receptacle 912, FIG. 9) and switch the actuator switch to a 'Start' position, thereby electrically coupling the universal battery pack 12 to the starting device 18. Once the actuator switch is in the 'Start' position, the starter switch 20 may also be placed into the 'Start' position such that the universal battery pack 12 provides power to the starting device 18 (such as a starter solenoid 34, FIG. 2). While the universal battery pack 12 has been shown, it is appreciated that alternatively, the permanently mounted battery pack 1612 in housing 1616 (FIG. 17) may be used.

Once the IC engine 14 is started, the spring loaded starter switch 20 may return to the 'ON' position. In the 'ON' position, the starter switch may direct power from the ignition unit 24 to the spark plug 26. Each time spark plug 26 fires, spark is provided to IC engine 14, which is utilized to ignite a compressed fuel and air mixture present in a cylinder (not shown) during a compression cycle of IC engine 14. When IC engine 14 is running it turns alternator 36, which creates an output voltage usable to provide AC power at outlet 22.

In addition, once the IC engine 14 has been started, the actuator switch 1662 may be moved to a 'Charge' position. In the 'Charge' position, the actuator switch 1662 may electrically connect the charging circuit 1630 to universal battery pack 12 to charge the universal battery pack 12. It is contemplated that the actuator switch 1662 may be spring-loaded so that it returns to the 'Charge' position upon successfully starting the IC engine 14. It is also contemplated that the operation of the actuator switch 1662 and the starter switch 20 may be combined into a single switch. In this way, a single start switch of the generator system 1660 may be wired such that charging is deactivated when the start switch is turned to the 'Start' position and then reactivates charging when the momentary start switch is released.

Figure 19:
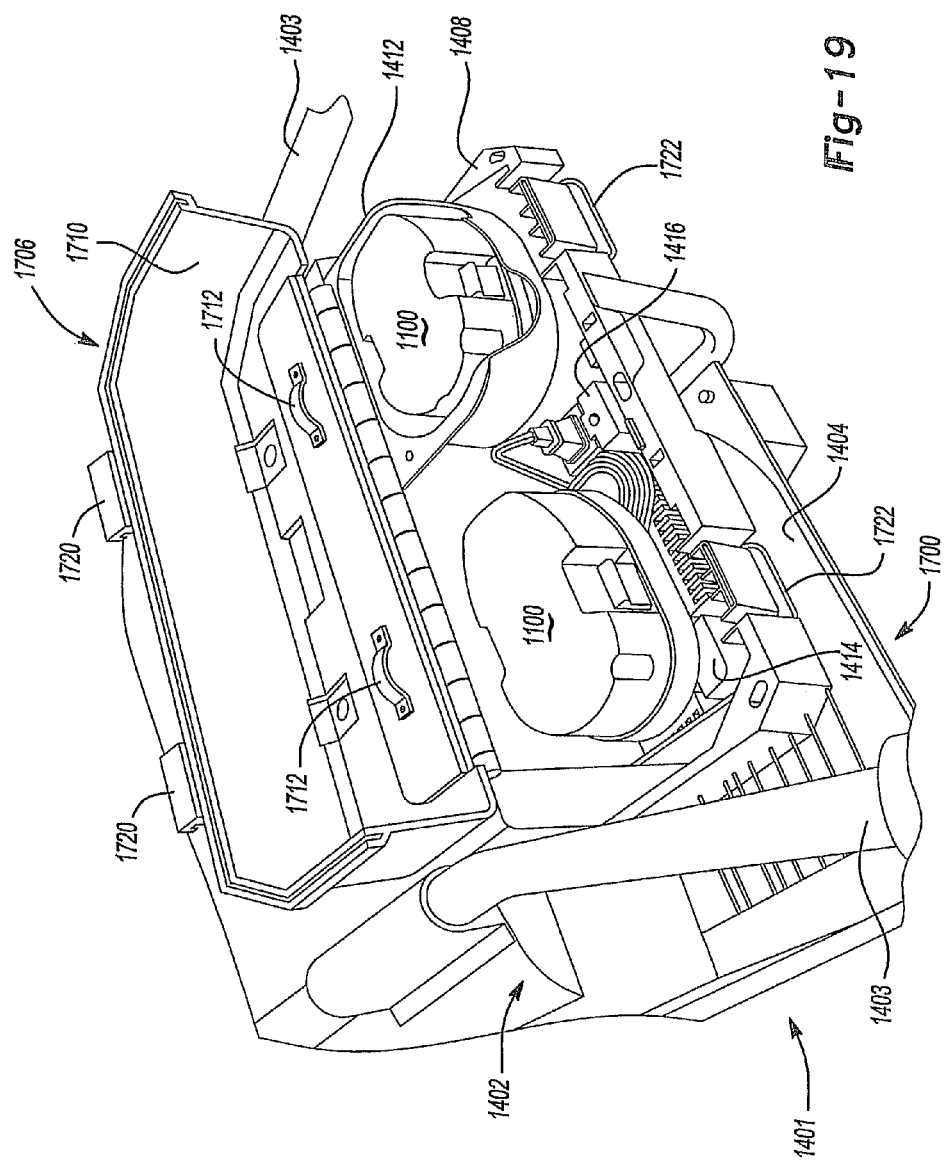
FIG. 19 is a side perspective view of the portable generator of FIG. 14 shown with biasing elements in a lid of a battery pack/charger enclosure according to another embodiment.
Figure 20:
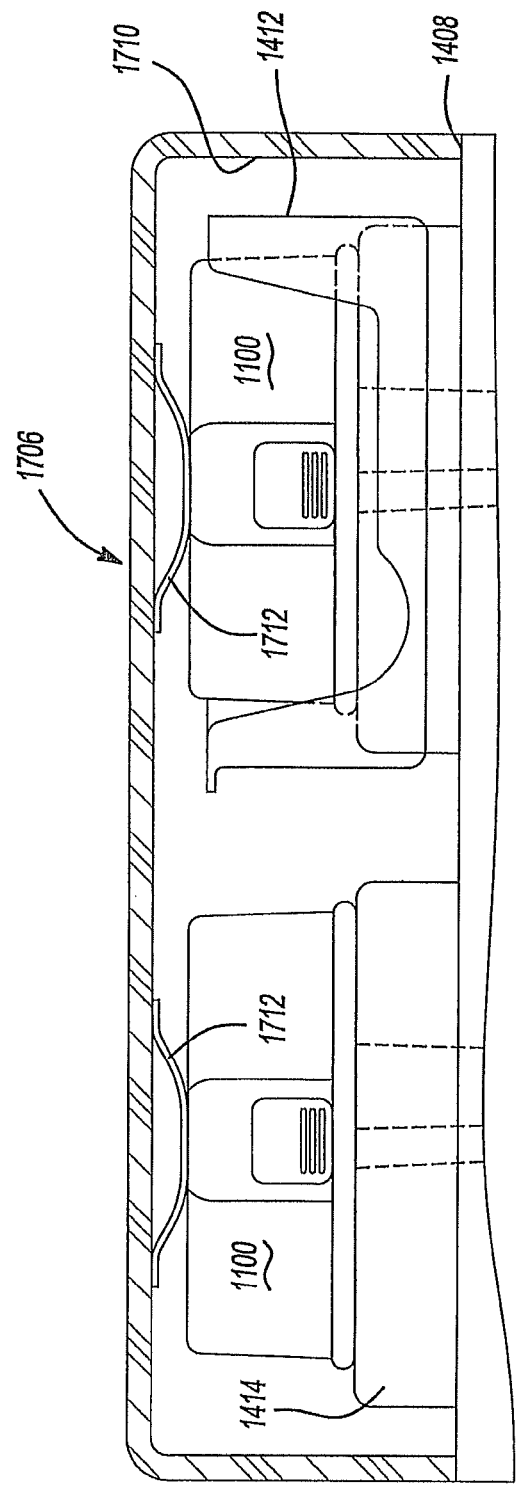
FIG. 20 is a sectional view taken along line 20-20 of FIG. 19.

With reference now to FIGS. 19 and 20, a portable generator 1700 having an enclosure 1706 is shown. The portable generator 1700 may include the frame 1402 that supports the IC engine 1404. The frame 1402 may illustratively support wheels 1401 (FIG. 8), and include handles 1403 for facilitating moving the generator 1700.

An electric generator device (hidden from view in FIG. 14) may be coupled to an output shaft of internal combustion engine 1404. The electric generator device generates AC power, such as has been described above. The AC power may illustratively be 120 VAC (or 110 or 115 VAC) and may also illustratively be 240 VAC (or 220 or 230 VAC). It may be 60 Hz, or may be 50 Hz. Generator 1700 may also include a control panel including AC outlets (not shown in FIG. 14).

Generator 1700 further includes enclosure 1706 mounted to frame 1402. The enclosure 1706, which may illustratively be a water resistant enclosure, includes a rectangular tub shaped base portion 1408 and hinged lid 1710 including biasing members 1712. As will be described, the biasing member 1712 urge the batteries 1100 into the respective battery receptacle 1412 and charger 1414 when the hinged lid 1710 is in a closed position. The biasing member 1712 may comprise any biasing structure such as a leaf spring for example. A pair of latches 1720 may be provided on the hinged lid 1710 for securably coupling to a pair of hooks 1722 provided on the base portion 1408 when hinged lid 1710 is in the closed position.

The base portion 1408 of enclosure 1406 includes battery receptacle 1412, charger 1414 and AC outlet 1416. Battery receptacle 1412 is configured to receive a battery pack from a cordless power tool, such as battery pack 1100. In this regard, battery receptacle 1412 may be configured to receive a tower type of battery pack, such as battery pack 1100, as is charger 1414. As such, battery receptacle 1412 may illustratively have a configuration similar to battery receptacle 912 described above. Battery receptacle 1412 may alternatively be configured to receive a rail type of battery pack, such as battery pack 16 shown in U.S. Pat. No. 6,653,815, the disclosure of which is incorporated herein in its entirety by reference. As such, battery receptacle 1412 has a configuration similar to that on the foot of tool 10 of U.S. Pat. No. 6,653,815. That is, battery receptacle 1412 includes a pair of grooves that receives guide rails of the rail type battery pack. It also includes a connector configured to mate with the terminal block of the rail type battery pack.

With specific reference now to FIG. 20, the hinged lid 1710 is shown in the closed position. As illustrated, the biasing members 1712 engage an upper surface of the battery packs 1100 and urge them downward into the receptacles 1412 and charger 1414. As a result, electrical connection of battery packs 1100 in receptacle 1412 and charger 1414 may be maintained during movement of the generator system 1700 such as by physical movement of the generator system 1700 as a whole or by vibratory movement communicated by the IC engine 14 during use. It is appreciated that the biasing members 1712 may additionally be provided on the housing 1616 disclosed for use with the permanent battery pack 1612 (FIG. 17).

Figure 21:
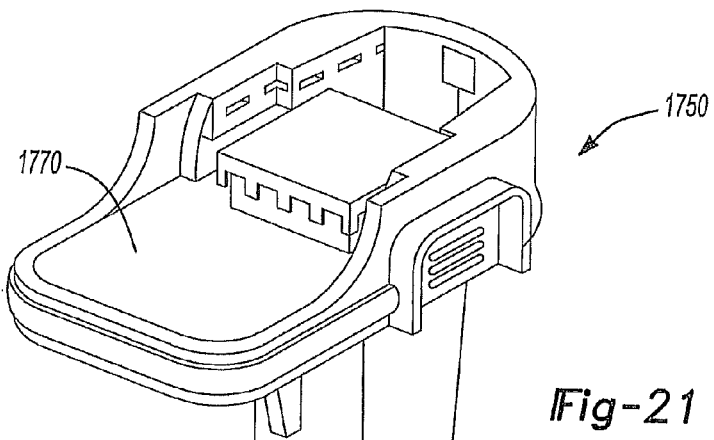
FIGS. 21 and 22 are side perspective views of adapters for accepting battery packs having various geometries.
Figure 22:
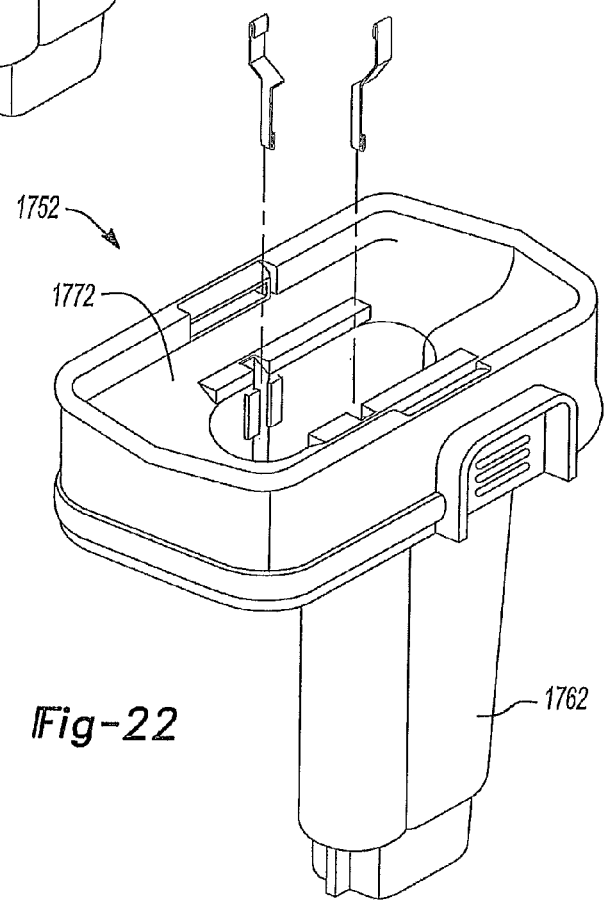

Turning now to FIGS. 21 and 22, a pair of adapters 1750 and 1752 according to additional features of the present teachings are illustrated. The adapters 1750 and 1752 each have insertion portions 1760 and 1762, respectively for receipt into battery receptacles 912 (FIGS. 8-10) and/or 1412 (FIGS. 14, 19 and 20). The adapter 1750 has a battery receptacle portion 1770 while the adapter 1752 has a battery receptacle portion 1772. Terminals 1776 may be located in the battery receptacle portion 1772 for electrical communication with a battery pack (not shown) received into the adapter 1752 in the battery receptacle portion 1772. As will be described, the adapters may be selectively inserted into any of the battery receptacles 912, and/or 1412 enabling battery receptacles 912 and or 1412 to accept battery packs having different footprints. In one aspect, these battery packs may be battery packs for use with power tools such as for different brands of power tools. Footprint as used with respect to a battery back relates to a battery receptacle portion 1772 of adapter 1752 means that part of the battery pack that is received in the battery receptacle portion 1772.

As can be appreciated, the respective battery receptacle portions 1770 and 1772 may define complementary geometry to accept battery packs having a footprint distinct from the tower 1104 of the DEWALT® battery pack 1100 described in the examples above (FIG. 11). During use, a desired adapter 1750 or 1752 may be selectively inserted into battery receptacle 912, and/or 1412. One skilled in the art will appreciate that the insertion portions 1760 and 1762 mate with the receptacles 912 and/or 1412 similar to a battery pack 1100. Once the desired adapter has been inserted, a battery pack (not shown) having complementary mating structure with the battery receptacle portions 1770 or 1772 may be selectively inserted into the adapter 1750, 1752.

In one example, the additional height realized by using the adapter 1750, 1752 may be accommodated by the biasing member 1712. In another example, other biasing members and/or hinged lids 1710 may be provided to accommodate various geometry battery packs.

Figure 23:
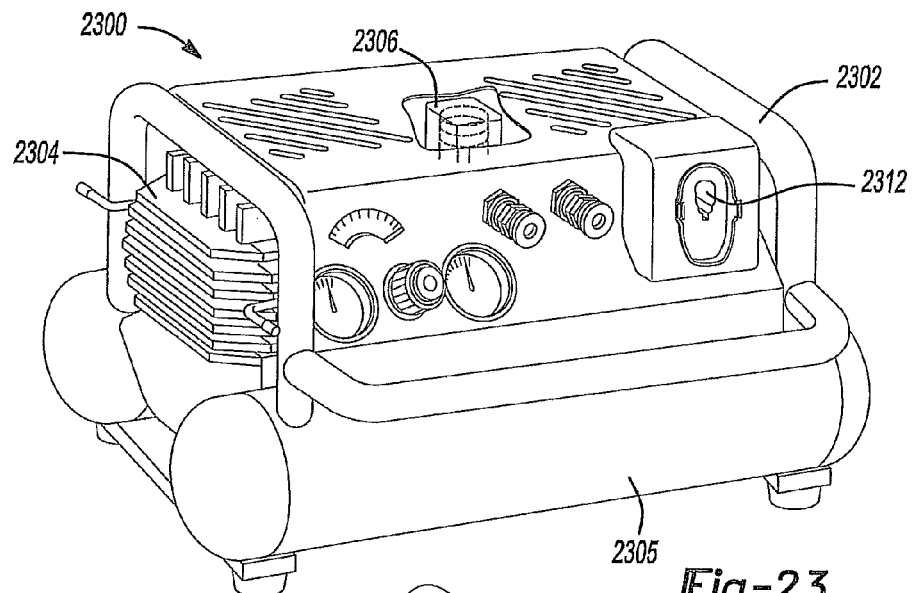
FIG. 23 is a side perspective view of a compressor.

FIG. 23 shows a compressor 2300 in accordance with an aspect of the disclosure. The compressor 2300 may incorporate any of the features discussed herein with respect to the portable generators 800 and/or 1400. The compressor 2300 includes a frame 2302 that supports an internal combustion engine 2304, an output device such as air compressor 2306 driven by the internal combustion engine 2304, and an air tank 2305 coupled to an output of the air compressor 2306. A battery receptacle 2312 may be electrically coupled to an electrically powered starting device for starting the internal combustion engine 2304 and/or charging the battery, such as the starting devices and charging circuits described above. In this way, the power generating device 16 may be replaced with an output device such as the compressor 2306, or other associated output of the compressor 2300.

Figure 24:
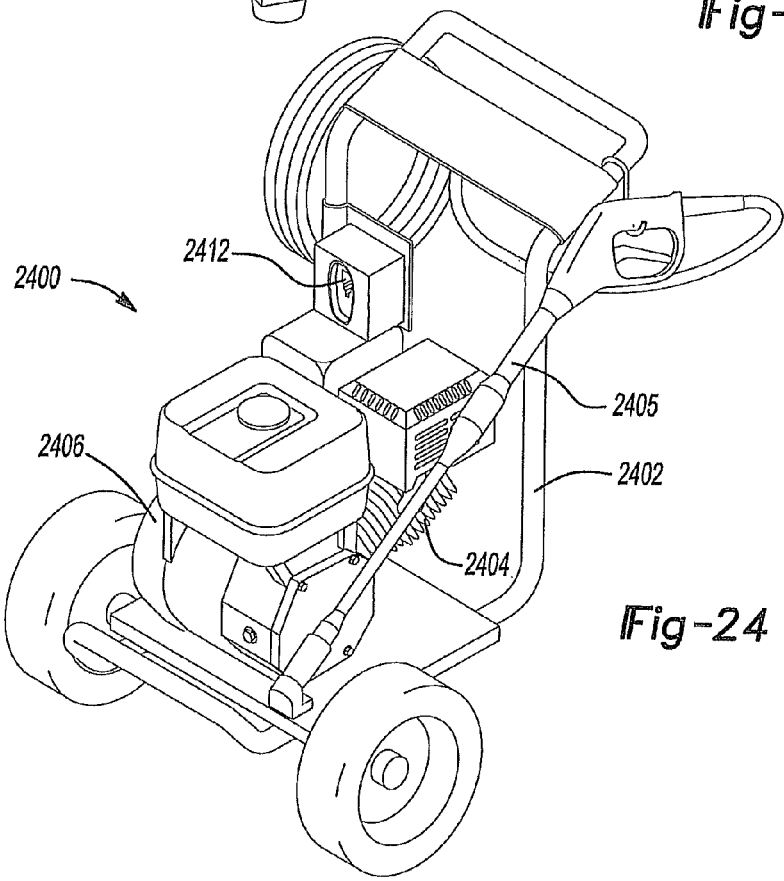
FIG. 24 is a side perspective view of a power washer.

FIG. 24 shows a power washer 2400 in accordance with an aspect of the disclosure. The power washer 2400 may incorporate any of the features discussed herein with respect to the portable generator 800 and/or 1400. The power washer 2400 includes a frame 2402 that supports an internal combustion engine 2404 and an output device such as a pump 2306 driven by the internal combustion engine 2304. An output of pump 2306 is coupled to a movable spray wand 2405. A battery receptacle 2412 may be electrically coupled to an electrically powered starting device for starting the internal combustion engine 2404 and/or charging the battery, such as the starting devices and charging circuits described above. In this way, the power generating device 16 may be replaced with an output device such as a pressure regulating device, spray wand 2405, or other associated output of the power washer 2400.

It is appreciated that other power driven apparatus may be adapted for use with the means for starting the internal combustion engine as disclosed herein.

In an aspect, the charger, such as charger [1414] can be a charging circuit instead of a stand-alone charger.

The charging function alone in a generator panel is relatively straightforward. The engine starting function is also straightforward. Technical complications, however, arise when these two functions are combined using the same battery socket. For this reason, the battery charging function should be isolated from the engine starting function.

Some previously designed charger circuits have not had electrical isolation from the AC power cord to the battery socket terminals. This works acceptably as long as the battery socket terminals are inaccessible during charger operation. In a generator application, however, electrical connections to the engine starter motor may pose a potential AC leakage path from the alternator output to the generator frame. An isolated charger design would address some of the electrical isolation challenges.

As discussed, electric start generators have often used a lead-acid type battery. Lead-acid batteries can be float charged from a constant voltage source. Charging is inherently fast when the battery is depleted. Charging slows as the battery voltage rises. Nickel chemistry batteries typically require a charge termination algorithm for fast charge times. Some Ni chemistry cells can be float charged at a C/6 rate. This reduces cycle life and is not recommended for higher power cells. The charging time also tends to be very slow, often on the order of 6-10 hours. Li-Ion batteries typically require a strict cut-off of charge current when the cells reach a specified voltage. A charger with multiple charging termination systems is desired for these reasons.

A battery charger will typically slightly over-charge a NiCad battery pack that already has a nearly full charge. The charger terminates charge by minus delta V method and slightly over-charges the pack. This can shorten the useful life of the NiCad battery pack, particularly since a NiCad battery pack may only be discharged slightly in a single start. For example, if a fresh NiCad battery pack can start the engine 100 times, then a single start would only discharge the NiCad battery pack about one percent.

Assume a NiCad pack has a useful life of 750 charge cycles. Assume the charging system immediately begins a charge cycle each time the generator engine is started. If the generator is started three times per day, then the battery may be worn out after 250 working days or less than 1 year. Li-Ion packs do better in this scenario because state of charge is easier to determine. Charge termination is typically based on a maximum cell voltage.

Battery packs with internal electronics, like Li-Ion, may use one software algorithm to manage performance during discharge and another algorithm to manage charging. Normally, the user removes the pack from a power tool and then inserts it into a charger. There is typically a delay of at least one second between operating modes. During engine starting the battery operates in a discharge mode, supplying DC current to the starter motor to energize the starter motor. If charging begins immediately after starting, it may be possible to start charging before the battery pack electronics can switch operating modes. This could cause a battery or charger malfunction. The same may be true when changing from charging to discharging.

Gasoline engine maintenance is often neglected on a jobsite. The engine may be hard to start and then stall repeated times. Multiple restarts may be needed before the engine speed stabilizes. Repeated start-charge cycles within a short time could stress the battery pack and charger system.

A start-charge selector switch may be used to select engine starting or battery charging. This is one solution to overcome the above described technical challenges. The selector switch may transfer all of the battery connections between the charging and starting systems. It may also switch sections of the charger circuit and starting circuit to achieve a separation of functions.

A manual selector switch is one way to accomplish the above-described separation of functions. The manual selector switch is first placed in the "Start" position. This disables or isolates the charging function. The engine starting function is connected and enabled. The engine Start/Run switch may be operated to start the engine. Once the engine is running smoothly, the user may select the "Charge" position if desired. Charging is often required once or twice per week for most users. In this example the selector switch must be returned to the 'Start' position to start the engine. The manual selector switch may also be used as an interlock on the Start/Run switch to prevent inadvertent starting.

When using a starter motor to start an internal combustion engine, such as those used on portable generators, battery current drawn by the starter motor can be relatively high. This typically requires heavy gauge wiring. If a selector switch is used to isolate the battery terminals from the starter motor, then the switch must have suitably robust current contacts to handle the starting current. Thus, the selector switch, in this example, would typically form a relatively expensive switch. In other electric start generators, the engine Start/Run switch does not carry starter current. The Start/Run switch connects to the starter solenoid and controls actuation of the solenoid. The solenoid controls makes or breaks high amperage switch contacts that pass the full starting current therethrough to the motor when the switch contacts are closed.

In one aspect, the Start/Charge selector switch may be connected into the starter solenoid circuit. When the selector switch is in the charge position, the starter solenoid cannot be energized. Battery positive is disconnected at the selector switch and at the starter solenoid high current switch. When the selector switch is in the starting position, the starter solenoid operates normally. This approach avoids the need for an additional high current switch to select starting.

In one aspect of the present disclosure the output current of the charger is less than 5 A and does not require special switches. The charger has signal wires connected to the battery in addition to the DC charging wires. These signal wires could be a possible AC leakage path from the charger circuit to the engine frame. In an aspect, an isolated alternator winding prevents leakage current.

Charger operation is prevented when the Start/Charge selector switch is in the 'Start' position. This prevents the starting circuit from interfering with the charger function. The DC charging wires could be switched to separate (i.e., disable or inhibit) the charger. The signal wires may also need to be switched to avoid a charger malfunction. One implementation is to switch the AC power to the charger. When the Start/Charge selector switch is in the 'Start' position no AC power is connected to the charger. This stops (or inhibits) charger operation. When the Start/Charge selector switch is placed in the 'Charge' position, the charger is able to receive AC power. A charging operation may be started automatically after the Start/Charge selector switch is moved into the 'Charge' position.

In one aspect the Start/Charge selector switch may be an automatic switch. Repeated top-off charging of the battery pack is undesired. Some automatic charging control is needed to decide when to operate the switch. Such a control could look at a variety of factors to make an automatic charging decision, as described below.

Battery pack removal may be detected so that automatic charging begins automatically when a battery pack is exchanged. The system may be configured to recognize this scenario even if the engine is not running.

Charge (amp-hours) into and out of the battery pack could be measured to determine the state of charge. Automatic charging may be configured to start if the state of charge is below a fixed percentage. The number of starter operations could also be counted to estimate battery state of charge. The cumulative seconds of starter operations could be counted to estimate battery state of charge.

Battery voltage may also be monitored to estimate a state of charge. However, this is not necessarily an accurate method with NiCad batteries. The voltage is relatively flat at different states of charge. Battery pack temperature also has a large influence on battery voltage. Measuring battery voltage, however, is an effective way to estimate the state of charge for Li-Ion batteries. If battery voltage is too low, then automatic charging can start. The alternator voltage should be stable for a fixed or variable amount of time before automatic charging begins. The environmental temperature should also be within acceptable limits before automatic charging begins.

The state of charge may be reset if the battery pack is removed. A second battery would have an unknown state of charge at insertion. A battery pack may be removed or installed at any time. The engine may be running or not. In one aspect of the present disclosure the system may detect the removal of the battery pack even when the engine is not running. A timing function may also be used to start automatic charging after a fixed period of days.

The automatic charging switch may consist of a relay that directly replaces a user engageable (i.e., manual) Start/Charge switch. Alternatively, the charger and starting circuits could be controlled by solid-state switches. The charger circuitry may include circuitry to enable, disable or suspend operation of the charger. In this aspect, the Start/Run switch may be coupled to the charger and the internal circuitry of the charger senses whether the Start/Run switch is in the 'Start' position or the 'Run' position. If the Start/Run switch is in the 'Start' position, the internal charger circuitry disables the charger. If the Start/Run switch is in the 'Run' position, the internal charger circuitry enables the charger. In an isolated charger, this may allow the separate charger control switch to be dispensed with.

A number of chargers have electrical isolation inside the charger circuit. This eliminates some of the AC leakage paths described above. This also simplifies switching somewhat. In general, internal isolation in the charger eliminates the need for an isolated alternator winding or additional switch poles. FIG. 30 shows a wiring topology of a generator having a charger with internal isolation. The other technical complications still exist.

Some NiCad battery packs have separate charge and discharge terminals. A separate charge terminal allows a fuse or a thermostat in the charge path. A fuse or thermostat is not desired in the discharge path to a power tool. This is also true for the generator starting application. The separate charge and discharge terminals require a different wiring method, but give no advantage.

Some Li-Ion battery packs also have separate charge and discharge terminals, but not for the same reasons as NiCad. For example, DEWALT® 36V and 28V Li-Ion systems have separate charge and discharge terminals. Other Li-Ion battery packs, such as the DEWALT® 18V Li-Ion battery packs do not have charge and discharge separate terminals. Li-Ion battery packs generally have internal circuitry that stops discharge when the cell voltages drop to a low level. Charging may be connected directly to the internal cell stack.

In one aspect, the starter load may be connected to the discharge terminal. The charger is connected to the charge terminal. Care is required to avoid simultaneous charge and discharge operation which could result in potential battery pack electronics or charger malfunction. The other technical complications still exist.

Figure 25:
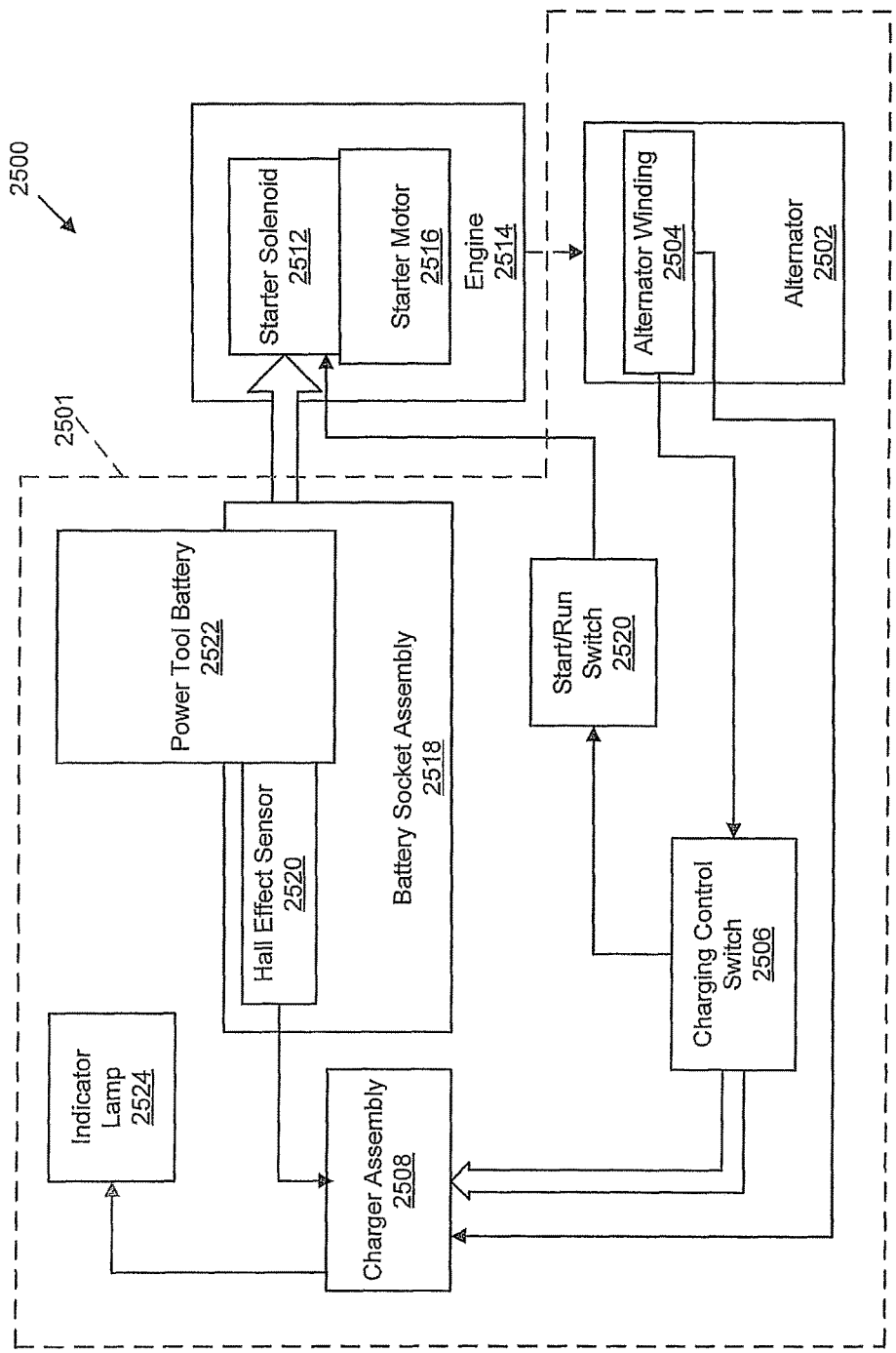
FIG. 25 is a block diagram of a portable electric generator having an electric start and an integral charging system in accordance with an aspect of the present disclosure.

FIG. 25 is a block diagram of a portable electric generator 2500 having an electric start and an integral charging system in accordance with one aspect of the present disclosure. The electric generator 2500 includes an alternator 2502 (or other electric generation device) having an alternator winding 2504. The winding 2504 is coupled to a charging control switch 2506, which is in turn coupled to a battery charger assembly 2508. A user actuatable Start/Run switch 2510 may also be operatively associated with the charging control switch 2506, as will be explained more fully in the following paragraphs.

The Start/Run switch 2510 switches power to a starter solenoid 2512 associated with an internal combustion engine 2514 of the generator 2500 when the Start/Run switch 2510 is moved into the 'Start' position, as described above, and when the charging control switch 2506 is simultaneously placed in its 'Start" position. The starter solenoid 2512, when energized, energizes a starter motor 2516 to start the engine 2514.

A battery socket assembly 2518, which may also be referred to herein as a "battery receptacle", is coupled to the starter solenoid 2512, such as through the Start/Run switch 2510. The battery socket assembly 2518 may include a Hall effect sensor 2520 that is in communication with the charger assembly 2508 and which senses the type of power tool battery pack 2522 that is inserted into the battery socket assembly 2518. The charger assembly 2508 is in communication with the battery socket assembly 2518 and provides a charging current to charge the battery pack 2522 when the battery pack is engaged in the battery socket assembly 2518, and when the charging control switch 2506 is in its 'Charge' position. An indicator lamp 2524 may be in communication with the charger assembly 2508 to indicate a charging status, for example to indicate that charging is, or is not, taking place, or that the battery pack is fully charged. The components within dashed line 2501 may be thought of as forming a charger system of the generator 2500.

Figure 26:
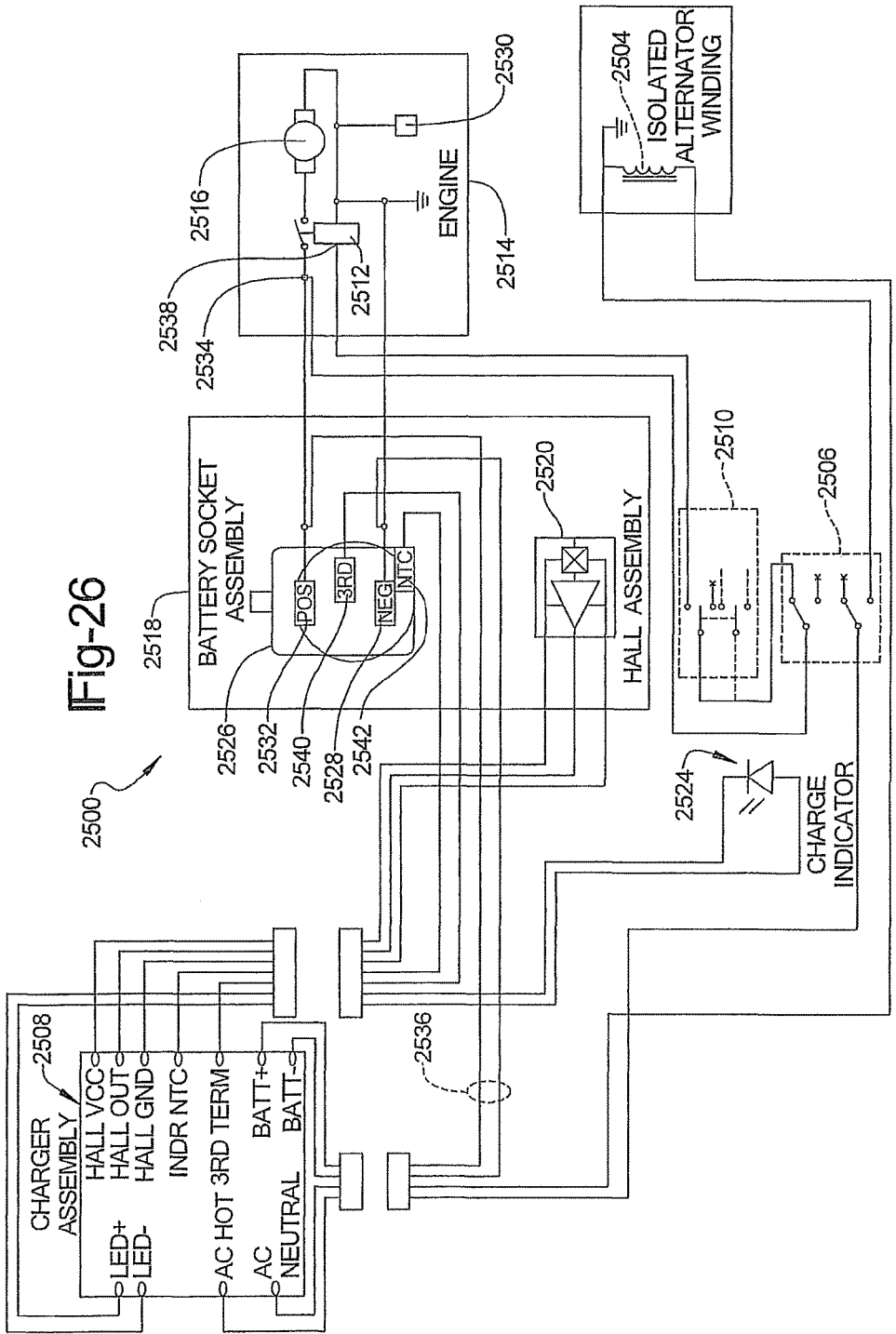
FIG. 26 is a more detailed schematic diagram of a wiring topology of the integral charging system of the generator of FIG. 25.

With reference to FIG. 26, one embodiment of a wiring topology of the generator of FIG. 25 is shown. AC power for the charger assembly 2508 (also referred to herein as the 'charger' 2508) comes from the isolated (no earth connection) alternator winding 2504. This winding 2504 is energized only when the engine 2514 is running. AC power is connected to the charger assembly 2508 when the charging control switch 2506 is in the 'Charge' position. When the charging control switch 2506 is in the 'Start' position (as shown in FIG. 26), no AC power can reach the charger assembly 2508 and the charger assembly is effectively disabled. In this embodiment the charging control switch 2506 comprises a double pole, single throw switch assembly.

The power tool battery 2522 (shown in FIG. 25) is installed in a battery socket 2526 of the battery socket assembly 2518. A negative terminal 2528 of the battery socket assembly 2518 is connected to the engine frame 2530 of the generator 2500. A positive terminal 2532 of the battery socket assembly 2518 is connected to the starter solenoid "battery" terminal 2534. These connections are typically made with heavy gauge wire, for example 12 AWG wire, and are always connected.

The DC output terminals 2536 of the charger assembly 2508 are directly connected to the positive and negative battery socket assembly terminals 2532 and 2528, respectively. These connections are always connected. The negative output (BATT−) of the charger assembly 2508 is connected to the engine frame 2530 through the battery socket assembly 2518 wiring. The isolated alternator winding 2504 allows this connection to be made.

One pole of the charging control switch 2506 connects to the starter solenoid 2512 positive battery terminal point 2534. When the charging control switch 2506 is in the 'Start' position, then a momentary depressing of the Start/Run switch 2510 closes its internal contacts such that a complete circuit is formed between the positive battery terminal 2534 of the starter solenoid 2512 and input terminal 2538 of the starter solenoid. Thus, when both switches 2506 and 2510 are closed, battery power from battery 2522 (FIG. 1) is applied to the internal coil (not shown) of the starter solenoid 2512 causing contact K1 associated with the starter solenoid to close. The application of DC current from the battery pack 2522 (FIG. 25) through contact K1 causes engagement of the pinion gear of the starter motor with the ring gear of the engine flywheel, closes the internal solenoid switch and runs the starter motor 2516. If the charging control switch 2506 is in the 'Charge' position, then the circuit path between the battery socket assembly positive terminal 2532 and the solenoid input terminal 2538 is interrupted and the starting operation is prevented. This also prevents battery discharging during the charging mode.

The battery socket assembly 2518 also may include the Hall-effect sensor assembly 2520 that operates to identify the battery chemistry type. This sensor may connect directly to the charger assembly 2508. A third terminal 2540 of the battery socket assembly 2518 also connects directly to the "3RD TERM" port of the charger assembly 2508. This third terminal 2540 carries a digital or analog signal from the battery pack 2522 to the charger assembly 2508. The digital or analog signal may illustratively be a temperature signal from a temperature sensor in the battery pack 2522. In the case of a digital signal, it may be a digital data signal such as from control circuitry of the battery pack 2522 that conveys information about certain characteristics of the battery pack. There is also a temperature sensor 2542 labeled "NTC" in the drawing figure at the negative ("NEG") terminal 2528 in the battery socket assembly 2518. This temperature sensor 2542 allows temperature estimation of older battery pack types, such as NiCad battery packs. This temperature sensor 2542 connects directly to the port labeled "INDR NTC" of the charger assembly 2508. The charger assembly 2508 also provides an output at ports labeled "LED+F" and "LED−" that drives the indicator lamp 2524 to provide a visual indication of a charging status. The indicator lamp 2524 in this example is a LED, although it will be appreciated that any other suitable form of indicator element could be used. The above described topology thus utilizes a two pole switch as the charging control switch 2506. Advantageously, the contacts of the charging control switch 2506 do not carry the high current that is used to drive the starter motor 2516.

Figure 27:
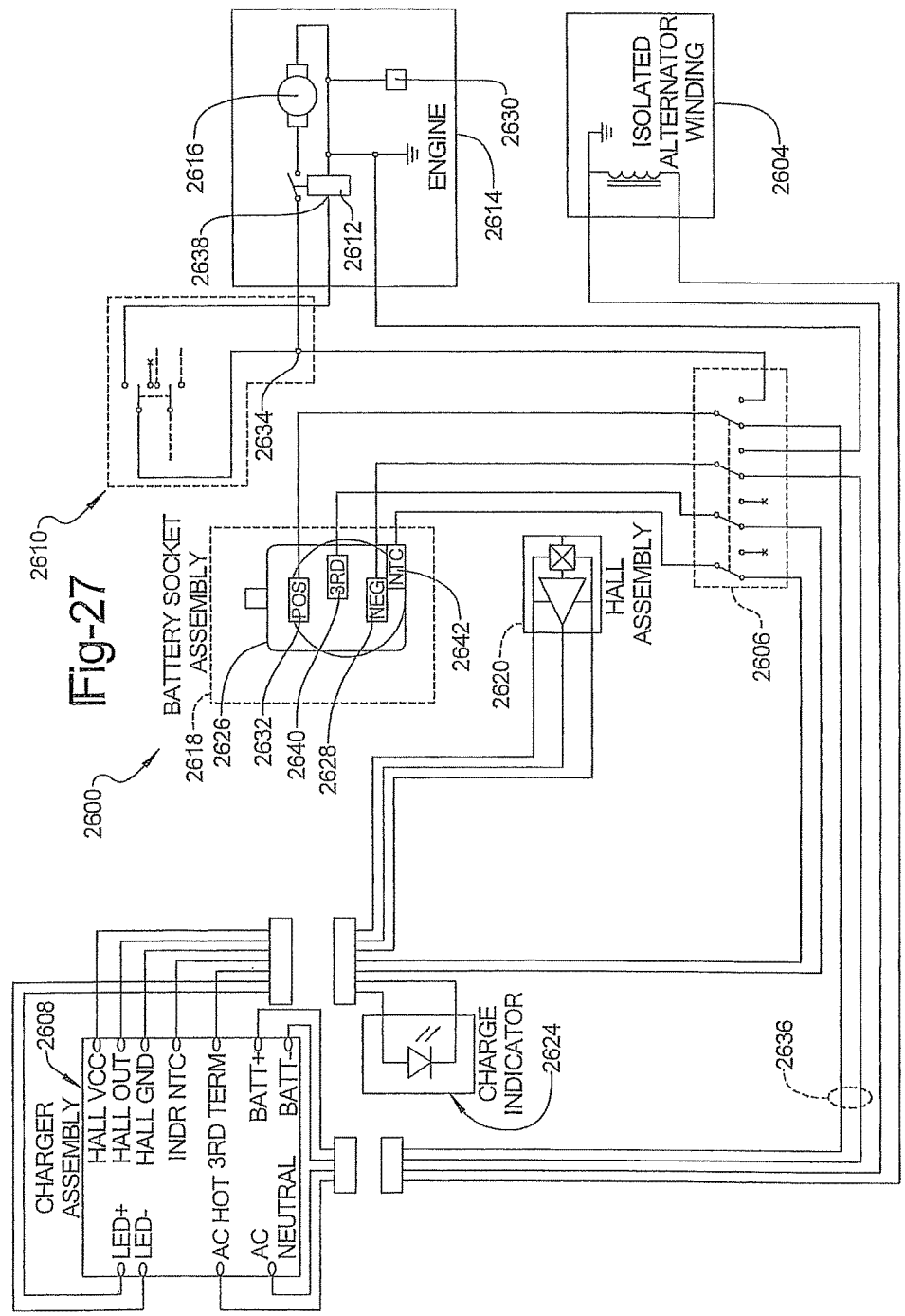
FIG. 27 is a schematic diagram of another embodiment of the integral charging system of FIG. 25.

FIG. 27 illustrates an embodiment 2600 of a wiring topology that is a variation of the generator of FIG. 25. Components in common with the embodiment of FIGS. 25 and 26 will be denoted with reference numerals increased by 100 over those used in FIGS. 25 and 26. In this embodiment AC power for the charger assembly 2608 comes from a non-isolated alternator winding 2604. The non-isolated alternator winding 2604 may be one of the main output windings from the alternator 2502 (FIG. 25). This winding 2604 is always connected to the charger assembly 2608. AC power is present when the engine 2614 is running.

The power tool battery 2522 (FIG. 25) is installed in the battery socket 2626 of the battery socket assembly 2618. The battery socket assembly negative 2628 and positive 2632 terminals are connected to separate poles of the charging control switch 2606. When the charging control switch 2606 is in the 'Charge' position, the battery socket assembly 2618 wires are connected to the DC output terminals (BATT+ and BATT−) of the charger assembly 2608 through conductors 2636. When the charging control switch 2606 is in the starting position, the battery socket 2626 assembly wires are connected to the engine starter through the Start/Run switch 2610. The charging control switch 2606 isolates the circuitry of the charger assembly 2608 from the starter circuitry (i.e., such as starter solenoid 2612 and starter motor 2616). The battery pack 2522 (FIG. 25), when inserted into the socket 2626 of the battery socket assembly 2618, can thus be connected implement only one function (i.e., either charging or starting) at a time.

The charging control switch 2606 also has poles to switch the third terminal 2640 signal and the other temperature sensor 2642 signal. These signals are connected to the charger assembly 2608 when the charging control switch 2606 is in the 'Charge' position. No connection is made when the charging control switch 2606 is in the 'Start' position.

This embodiment 2600 utilizes a four pole double throw switch as the charging control switch 2606. Two poles carry heavy current for the starter motor 2616. Two other poles carry lower current control signals. Alternatively, a plurality of independent switches with a suitable mechanical linkage may be used to implement the charging control switch 2606.

Figure 28:
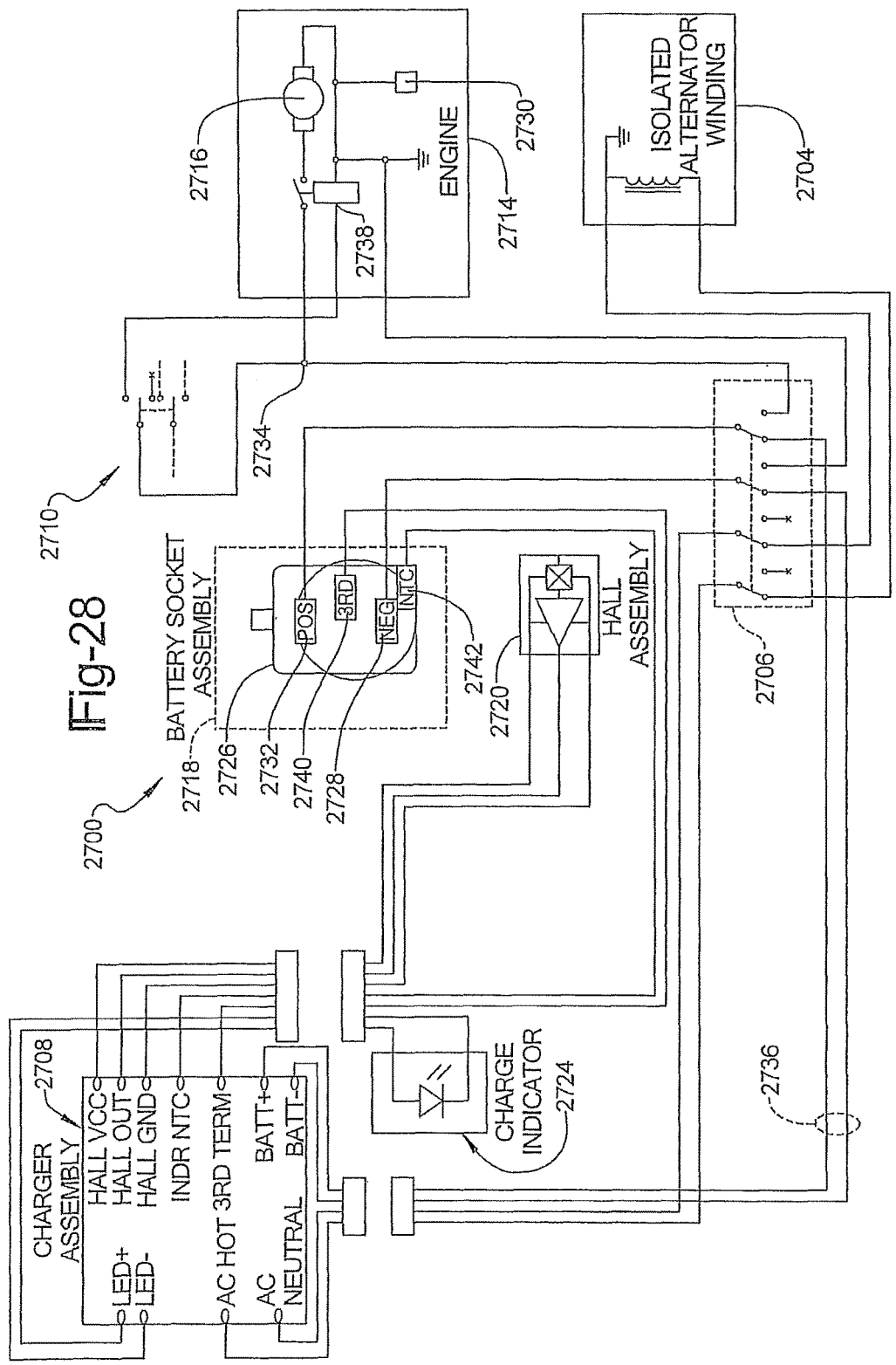
FIG. 28 is a schematic diagram of another embodiment of the integral charging system of FIG. 25.

FIG. 28 shows another embodiment 2700 of an alternative wiring topology and variation of the generator of FIG. 25. Reference numerals increased by 200 over those used in FIG. 26 will be used to denote components in common with those shown in FIG. 26. With the topology of embodiment 2700, AC power for the charger assembly 2708 comes from a non-isolated alternator winding 2704. AC power is present when the engine 2714 is running. The alternator winding 2704 is connected to two poles of the charging control switch 2706. When the charging control switch 2706 is in the 'Charge' position, AC power is applied to the charger assembly 2708. When the charging control switch 2706 is in the 'Start' position, AC power is removed from the charger assembly 2708. This switching action keeps live voltages away from the engine 2714 and the frame 2730.

With further reference to FIG. 28, the power tool battery 2522 (FIG. 25) is installed in a socket 2726 of the battery socket assembly 2718. The battery socket assembly negative 2728 terminal and positive terminal 2732 are connected to separate poles of the charging control switch 2706. When the charging control switch 2706 is in the 'Charge' position, the battery socket assembly 2718 conductors are connected to the DC output terminals (BATT+ and BATT−) of the charger assembly 2708 via conductors 2736. When the charging control switch 2706 is in the 'Start' position, the battery socket assembly 2718 conductors are connected to the engine starter 2716 through the Start/Run switch 2710. The charging control switch 2706 isolates the circuitry of the charger assembly 2708 from the starter solenoid 2712. The battery 2522 (FIG. 25) in the socket 2726 of the battery socket assembly 2718 can be connected to implement only one function (i.e., 'Charge' or 'Start') at a time. The third terminal 2740 signal and the temperature sensor signal 2742 from the battery socket assembly 2718 are always connected to the charger assembly 2708.

The embodiment 2700 of FIG. 28 utilizes a four pole double throw charging control switch. Two poles carry the high current for the starter motor 2716 while two other poles carry AC power from the non-isolated winding 2704 for powering the charger assembly 2708. Multiple switches with a mechanical linkage may alternatively be used to implement the charging control switch 2706.

Figure 29:
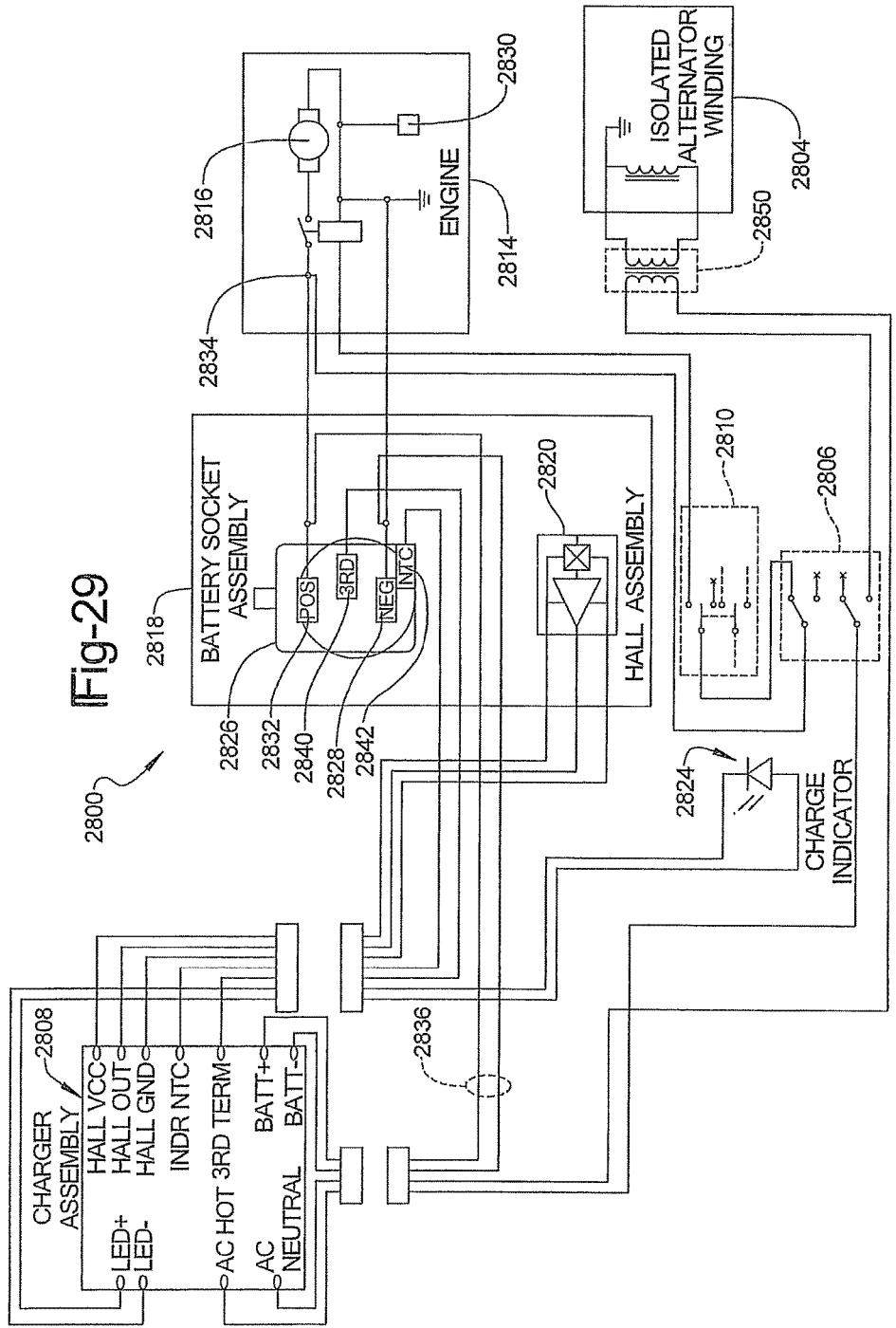
FIG. 29 is a schematic diagram of another embodiment of the integral charging system of FIG. 25.

FIG. 29 shows an alternative embodiment 2800 of the wiring topology and variation of the generator of FIG. 26. Embodiment 2800 is somewhat similar to the embodiment 2500 shown in FIG. 26, and components in common with those used in FIG. 26 will be denoted by reference numerals increased by 300 over those used in FIG. 26. In the embodiment 2800 of FIG. 29 an isolation transformer 2850 is used to separate the live alternator output voltage from the charger assembly 2808 circuitry. As in the topology of FIG. 26, the negative output terminal (BATT−) of the charger assembly 2808 is connected to the engine frame 2830 through the battery socket 2826 wiring.

The topology of the embodiment 2800 utilizes a two pole charging control switch 2806. The contacts of the charging control switch 2806 do not carry high current to the starter motor 2816. A special isolated alternator winding is not required.

FIG. 30 shows another embodiment 2900 of the generator of FIG. 26. This embodiment 2900 makes use of a topology that is similar to that used in the generator 2500 shown in FIG. 26, and components in common with those used in FIG. 26 will be increased by 400 over those used in FIG. 26. In FIG. 30 the charger assembly 2908 has full dielectric insulation 2952 between the AC power terminals (AC HOT and AC NEUTRAL) and the DC output terminals (BATT+ and BATT−). The control signals (i.e., at ports 3RD TERM and INDR NTC) are also separated from AC power by the dielectric insulation 2952. The circuit of the charger assembly 2908 contains an internal high-frequency transformer for isolation. As in the topology of FIG. 26, the negative output of the charger assembly 2908 is connected to the engine frame 2930 through the battery socket assembly 2918 wiring.

The embodiment 2900 utilizes a topology having a two pole charging control switch 2906. The contacts of the charging control switch 2906 do not carry high current to the starter motor 2916. A special isolated alternator winding is not required. The charger assembly 2908 has an isolated charger design as discussed above.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A portable generator system comprising:
   an internal combustion engine;
   a starting device for starting the internal combustion engine;
   a power generating device for generating an AC signal for powering a charger assembly, the charger assembly adapted to receive the AC signal and to generate a DC charging signal, the charger assembly including:
      a first user controllable switch for electrically coupling a battery pack receptacle to the starting device when the first user controllable switch is in a closed position; and
      a second user controllable switch that, when in a Start position and when the first user controllable switch is in the closed position, electrically couples the battery pack receptacle to the starting device while electrically decoupling the power generating device from the charger assembly, and when in a Charge position electrically couples the power generating device to the charger assembly while electrically decoupling the battery pack receptacle from the starting device.

2. The portable generator system of claim 1, further comprising a metallic frame for supporting the internal combustion engine, the power generating device, the starting device, and the charger assembly, wherein the charger assembly is electrically coupled to the metallic frame.

3. The portable generator system of claim 1, further comprising a metallic frame for supporting the internal combustion engine, the power generating device, the starting device, and the charger assembly, wherein the charger assembly is electrically isolated from the metallic frame.

4. The portable generator system of claim 1, further comprising an isolation transformer coupled between the power generating device and the charger assembly.

5. The portable generator system of claim 1, wherein the power generating device includes an alternator.

6. The portable generator system of claim 5, wherein the alternator includes an isolated winding for generating the AC signal.

7. The portable generator system of claim 5, wherein the alternator includes a non-isolated winding for generating the AC signal.

8. A portable generator system comprising:
   an internal combustion engine;
   a starting device for starting the internal combustion engine;
   a power generating device for generating an AC signal for powering a charger assembly, the charger assembly adapted to receive the AC signal and to generate a DC charging signal, the charger assembly including:
      a first user controllable switch for electrically coupling a battery pack receptacle to the starting device when the first user controllable switch is in a closed position; and
      a second user controllable switch that, when in a Start position and when the first user controllable switch is in the closed position, electrically couples the battery pack receptacle to the starting device while electrically decoupling the power generating device from the charger assembly, and when in a Charge position electrically couples the power generating device to the charger assembly while electrically decoupling the battery pack receptacle from the starting device, and
      a DC battery pack configured to be received in the battery pack receptacle to provide DC power to the starting device.

9. The portable generator system of claim 8, further comprising a metallic frame for supporting the internal combustion engine, the power generating device, the starting device, and the charger assembly, wherein the charger assembly is electrically coupled to the metallic frame.

10. The portable generator system of claim 8, further comprising a metallic frame for supporting the internal combustion engine, the power generating device, the starting device, and the charger assembly, wherein the charger assembly is electrically isolated from the metallic frame.

11. The portable generator system of claim 8, further comprising an isolation transformer coupled between the power generating device and the charger assembly.

12. The portable generator system of claim 8, wherein the power generating device includes an alternator.

13. The portable generator system of claim 12, wherein the alternator includes an isolated winding for generating the AC signal.

14. The portable generator system of claim 12, wherein the alternator includes a non-isolated winding for generating the AC signal.

* * * * *